United States Patent
Fischer et al.

(10) Patent No.: US 9,345,036 B2
(45) Date of Patent: *May 17, 2016

(54) FULL DUPLEX RADIO TRANSCEIVER WITH REMOTE RADAR DETECTION

(71) Applicant: CBF Networks, Inc., San Jose, CA (US)

(72) Inventors: Jeffrey Fischer, Boston, MA (US); Kishore Gandham, San Jose, CA (US); Kevin J. Negus, Hyattville, WY (US)

(73) Assignee: CBF Networks, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/608,024

(22) Filed: Jan. 28, 2015

(65) Prior Publication Data

US 2015/0139160 A1 May 21, 2015

Related U.S. Application Data

(63) Continuation of application No. 14/151,190, filed on Jan. 9, 2014, now Pat. No. 8,982,772, which is a continuation-in-part of application No. 13/645,472, filed on Oct. 4, 2012, now Pat. No. 8,811,365, which is (Continued)

(51) Int. Cl.
*H04W 72/00* (2009.01)
*H04W 72/08* (2009.01)
(Continued)

(52) U.S. Cl.
CPC ............. *H04W 72/082* (2013.01); *H01Q 1/246* (2013.01); *H01Q 21/24* (2013.01); *H01Q 21/29* (2013.01); *H01Q 25/00* (2013.01); *H01Q 25/005* (2013.01); *H04B 7/04* (2013.01);
(Continued)

(58) Field of Classification Search
None
See application file for complete search history.

(56) References Cited

U.S. PATENT DOCUMENTS

| D307,274 S | 4/1990 | Sasaki et al. |
| D335,128 S | 4/1993 | Soren |

(Continued)

FOREIGN PATENT DOCUMENTS

| EP | 2745539 | 6/2014 |
| EP | 2767102 | 8/2014 |

(Continued)

OTHER PUBLICATIONS

Amendment and Response to Office Action in U.S. Appl. No. 13/632,993, dated Jul. 27, 2015.

(Continued)

*Primary Examiner* — Hassan Phillips
*Assistant Examiner* — Gautam Sharma
(74) *Attorney, Agent, or Firm* — Nixon Peabody LLP

(57) ABSTRACT

A radar detector is used with a radio link, the radio link characterized by high duty factor operation of a radio transmitter. The radar detector is located a sufficient distance from the radio transmitter that the radar detector is not overwhelmed by the radio transmission signal in that channel and can detect sufficiently low level radar signals to ascertain potential radio interference at the radar from said radio transmitter. The results of the radar detection are communicated to the transmitter in a way that impacts the transmitter's use of the sensed channel. This communication can occur reactively when a radar detection is achieved (the absence of which indicates no radar has been detected) and/or can be a periodic or event-driven indication that the channel is available for operation (the information expiring if the result is not refreshed).

51 Claims, 9 Drawing Sheets

Related U.S. Application Data a continuation of application No. 13/371,366, filed on Feb. 10, 2012, now Pat. No. 8,311,023, which is a continuation of application No. 13/212,036, filed on Aug. 17, 2011, now Pat. No. 8,238,318.

(60) Provisional application No. 61/857,661, filed on Jul. 23, 2013.

(51) Int. Cl.

| | | |
|---|---|---|
| H01Q 1/24 | (2006.01) | |
| H01Q 21/24 | (2006.01) | |
| H01Q 21/29 | (2006.01) | |
| H01Q 25/00 | (2006.01) | |
| H04W 16/14 | (2009.01) | |
| H04B 7/04 | (2006.01) | |
| H04K 3/00 | (2006.01) | |
| H04W 52/36 | (2009.01) | |

(52) U.S. Cl.
CPC .............. *H04K 3/28* (2013.01); *H04K 3/822* (2013.01); *H04W 16/14* (2013.01); *H04K 3/224* (2013.01); *H04K 3/226* (2013.01); *H04K 2203/32* (2013.01); *H04K 2203/36* (2013.01); *H04W 52/367* (2013.01)

(56) References Cited

U.S. PATENT DOCUMENTS

| | | |
|---|---|---|
| D349,897 S | 8/1994 | Soren et al. |
| D373,771 S | 9/1996 | Messelhi |
| 5,579,367 A | 11/1996 | Raymond et al. |
| D376,367 S | 12/1996 | Mailandt |
| D376,600 S | 12/1996 | Vallilee et al. |
| 5,604,744 A | 2/1997 | Andersson et al. |
| 5,809,422 A | 9/1998 | Raleigh et al. |
| D401,592 S | 11/1998 | Nishimura et al. |
| 5,890,055 A | 3/1999 | Chu et al. |
| RE36,591 E | 2/2000 | Hayashi et al. |
| 6,253,060 B1 | 6/2001 | Komara et al. |
| 6,310,584 B1 | 10/2001 | Reece et al. |
| D455,420 S | 4/2002 | Arpe |
| 6,377,217 B1 | 4/2002 | Zhu et al. |
| 6,462,710 B1 | 10/2002 | Carson et al. |
| 6,463,303 B1 | 10/2002 | Zhao |
| 6,486,828 B1 | 11/2002 | Cahn et al. |
| 6,529,172 B2 | 3/2003 | Zimmerman |
| 6,675,012 B2 | 1/2004 | Gray |
| 6,912,195 B2 | 6/2005 | Vook et al. |
| D507,263 S | 7/2005 | Narita |
| 6,985,123 B2 | 1/2006 | Gottl |
| 6,995,712 B2 | 2/2006 | Boyanov |
| 7,027,837 B1 | 4/2006 | Uhlik et al. |
| 7,113,806 B2 | 9/2006 | Gray |
| 7,120,138 B2 | 10/2006 | Soomro et al. |
| 7,155,230 B2 | 12/2006 | Tsien |
| 7,158,759 B2 | 1/2007 | Hansen et al. |
| 7,171,223 B2 | 1/2007 | Herscovich et al. |
| 7,221,722 B2 | 5/2007 | Thomas et al. |
| 7,260,141 B2 | 8/2007 | Bierly et al. |
| 7,280,067 B2 | 10/2007 | Chiodini |
| 7,280,082 B2 | 10/2007 | Theobold et al. |
| 7,292,663 B1 | 11/2007 | Van Wechel et al. |
| 7,327,763 B2 | 2/2008 | Ophir et al. |
| D565,534 S | 4/2008 | Ingalsbe et al. |
| 7,394,439 B1 | 7/2008 | Johnson et al. |
| 7,400,612 B2 | 7/2008 | Yamaura |
| 7,403,501 B2 | 7/2008 | Bordonaro et al. |
| 7,499,964 B2 | 3/2009 | Busch et al. |
| D595,274 S | 6/2009 | Skottke et al. |
| D596,627 S | 7/2009 | Cho et al. |
| 7,583,933 B2 | 9/2009 | Hansen et al. |
| 7,587,177 B1 | 9/2009 | Kwong |
| 7,593,729 B2 | 9/2009 | Barak et al. |
| 7,599,290 B2 | 10/2009 | Dos Remedios et al. |
| D604,724 S | 11/2009 | Vorreiter et al. |
| 7,616,554 B2 | 11/2009 | Asai et al. |
| 7,620,370 B2 | 11/2009 | Barak et al. |
| 7,623,060 B1 | 11/2009 | Chhabra et al. |
| D619,571 S | 7/2010 | Lee |
| 7,756,519 B2 | 7/2010 | Barak et al. |
| D622,256 S | 8/2010 | Lockenwitz |
| 7,813,318 B2 | 10/2010 | Hu |
| 7,834,800 B1 | 11/2010 | Chhabra et al. |
| 7,840,187 B2 | 11/2010 | Ji |
| 7,848,241 B2 | 12/2010 | Natarajan et al. |
| 7,864,744 B2 | 1/2011 | Song et al. |
| 7,881,273 B2 | 2/2011 | Yamaura |
| 7,948,942 B2 | 5/2011 | Zhang et al. |
| 7,978,144 B2 | 7/2011 | Tanabe et al. |
| D643,025 S | 8/2011 | Podduturi |
| 8,031,618 B2 | 10/2011 | Hu |
| 8,055,213 B2 | 11/2011 | Hui et al. |
| 8,078,109 B1 | 12/2011 | Mulcay |
| 8,150,955 B2 | 4/2012 | Busch et al. |
| 8,175,079 B2 | 5/2012 | Alapuranen et al. |
| 8,175,535 B2 | 5/2012 | Mu |
| 8,228,884 B2 | 7/2012 | Yamaura |
| 8,233,908 B2 | 7/2012 | Cho et al. |
| 8,238,318 B1 | 8/2012 | Negus |
| 8,249,527 B2 | 8/2012 | Rybicki |
| 8,290,503 B2 | 10/2012 | Sadek et al. |
| 8,300,590 B1 | 10/2012 | Negus et al. |
| 8,311,023 B1 | 11/2012 | Negus |
| 8,385,305 B1 | 2/2013 | Negus et al. |
| 8,422,540 B1 | 4/2013 | Negus et al. |
| 8,467,363 B2 | 6/2013 | Lea et al. |
| 8,487,813 B2 | 7/2013 | Leiba et al. |
| 8,502,733 B1 | 8/2013 | Negus et al. |
| 8,503,383 B2 | 8/2013 | Hu et al. |
| 8,638,839 B2 | 1/2014 | Negus et al. |
| D704,174 S | 5/2014 | Negus et al. |
| 8,761,100 B2 | 6/2014 | Negus et al. |
| 8,811,365 B2 | 8/2014 | Negus |
| 8,824,442 B2 | 9/2014 | Lea et al. |
| 8,830,943 B2 | 9/2014 | Negus et al. |
| 8,872,715 B2 | 10/2014 | Lea et al. |
| 8,928,542 B2 | 1/2015 | Lea et al. |
| 8,942,216 B2 | 1/2015 | Negus et al. |
| 8,948,235 B2 | 2/2015 | Negus et al. |
| 8,982,772 B2 | 3/2015 | Fischer et al. |
| 8,989,762 B1 | 3/2015 | Negus et al. |
| 9,001,809 B2 | 4/2015 | Lea et al. |
| 9,049,611 B2 | 6/2015 | Negus et al. |
| 9,055,463 B2 | 6/2015 | Negus et al. |
| 2001/0030939 A1 | 10/2001 | Vijayan et al. |
| 2001/0035844 A1 | 11/2001 | Reece et al. |
| 2001/0050927 A1 | 12/2001 | Johnson |
| 2002/0048062 A1* | 4/2002 | Sakamoto et al. ............ 359/124 |
| 2002/0060993 A1 | 5/2002 | Dent |
| 2002/0064141 A1 | 5/2002 | Sakakura |
| 2002/0160769 A1 | 10/2002 | Gray |
| 2003/0002456 A1 | 1/2003 | Soomro et al. |
| 2003/0040319 A1 | 2/2003 | Hansen et al. |
| 2004/0006573 A1 | 1/2004 | Takashi |
| 2004/0033789 A1 | 2/2004 | Tsien |
| 2004/0116112 A1 | 6/2004 | Gray |
| 2004/0137924 A1 | 7/2004 | Herscovich et al. |
| 2004/0151238 A1 | 8/2004 | Masenten |
| 2004/0165650 A1 | 8/2004 | Miyazaki et al. |
| 2004/0179549 A1 | 9/2004 | Ophir et al. |
| 2005/0026616 A1 | 2/2005 | Cavalli et al. |
| 2005/0068231 A1 | 3/2005 | Regnier et al. |
| 2005/0075078 A1 | 4/2005 | Makinen et al. |
| 2005/0206554 A1 | 9/2005 | Yamaura |
| 2005/0215266 A1 | 9/2005 | Tsien et al. |
| 2005/0219140 A1 | 10/2005 | Browne et al. |
| 2005/0270218 A1 | 12/2005 | Chiodini |
| 2006/0056365 A1 | 3/2006 | Das et al. |
| 2006/0079290 A1 | 4/2006 | Seto et al. |
| 2006/0109815 A1 | 5/2006 | Ozer et al. |
| 2006/0141929 A1 | 6/2006 | Lockie et al. |
| 2006/0164271 A1* | 7/2006 | Hirt et al. .................... 341/143 |

(56) References Cited

U.S. PATENT DOCUMENTS

| | | |
|---|---|---|
| 2006/0209746 A1* | 9/2006 | Asai et al. .................. 370/328 |
| 2006/0253526 A1 | 11/2006 | Welch et al. |
| 2006/0273952 A1 | 12/2006 | Krikorian et al. |
| 2007/0054683 A1 | 3/2007 | Hansen et al. |
| 2007/0097899 A1 | 5/2007 | Larsson et al. |
| 2007/0105562 A1 | 5/2007 | Ji |
| 2007/0117517 A1 | 5/2007 | Hui |
| 2007/0146225 A1 | 6/2007 | Boss et al. |
| 2007/0149230 A1 | 6/2007 | Song |
| 2007/0155431 A1 | 7/2007 | Munzner et al. |
| 2007/0160020 A1 | 7/2007 | Osann |
| 2007/0218890 A1 | 9/2007 | Cho et al. |
| 2007/0243878 A1 | 10/2007 | Taira et al. |
| 2007/0264935 A1 | 11/2007 | Mohebbi |
| 2008/0014948 A1 | 1/2008 | Scheinert |
| 2008/0043882 A1 | 2/2008 | Zhang et al. |
| 2008/0080364 A1 | 4/2008 | Barak et al. |
| 2008/0089279 A1 | 4/2008 | Hu et al. |
| 2008/0089280 A1 | 4/2008 | Hu |
| 2008/0090575 A1 | 4/2008 | Barak et al. |
| 2008/0090581 A1 | 4/2008 | Hu |
| 2008/0100494 A1 | 5/2008 | Yamaura |
| 2008/0159212 A1 | 7/2008 | Zhang et al. |
| 2008/0181282 A1 | 7/2008 | Wala et al. |
| 2008/0214199 A1 | 9/2008 | Ji |
| 2008/0240307 A1 | 10/2008 | Wang et al. |
| 2008/0242232 A1 | 10/2008 | Zavadsky et al. |
| 2008/0274745 A1 | 11/2008 | Barak et al. |
| 2009/0010238 A1 | 1/2009 | Barak et al. |
| 2009/0052411 A1 | 2/2009 | Leung et al. |
| 2009/0067526 A1 | 3/2009 | Ratermann et al. |
| 2009/0092101 A1 | 4/2009 | Busch et al. |
| 2009/0111463 A1 | 4/2009 | Simms et al. |
| 2009/0121963 A1 | 5/2009 | Greene |
| 2009/0143017 A1 | 6/2009 | Barak et al. |
| 2009/0252127 A1 | 10/2009 | Rangarajan et al. |
| 2009/0252134 A1 | 10/2009 | Schlicht et al. |
| 2009/0274130 A1 | 11/2009 | Boch |
| 2009/0304055 A1 | 12/2009 | Nino et al. |
| 2009/0312022 A1 | 12/2009 | Viorel et al. |
| 2009/0323621 A1 | 12/2009 | Touboul et al. |
| 2010/0009694 A1 | 1/2010 | Fischer |
| 2010/0033396 A1 | 2/2010 | Tanabe et al. |
| 2010/0046439 A1 | 2/2010 | Chen et al. |
| 2010/0056205 A1 | 3/2010 | Fuss |
| 2010/0157970 A1 | 6/2010 | Gotman et al. |
| 2010/0197317 A1 | 8/2010 | Sadek et al. |
| 2010/0202391 A1 | 8/2010 | Palanki et al. |
| 2010/0246554 A1 | 9/2010 | Alapuranen et al. |
| 2010/0261423 A1 | 10/2010 | Stanforth et al. |
| 2010/0272006 A1 | 10/2010 | Bertrand et al. |
| 2010/0309048 A1 | 12/2010 | Polisetty et al. |
| 2011/0044279 A1 | 2/2011 | Johansson et al. |
| 2011/0070855 A1 | 3/2011 | Mariotti |
| 2011/0075586 A1 | 3/2011 | Hu et al. |
| 2011/0085525 A1 | 4/2011 | Patini |
| 2011/0096729 A1 | 4/2011 | Yamaura |
| 2011/0103292 A1 | 5/2011 | Pasad et al. |
| 2011/0164186 A1 | 7/2011 | Sadek et al. |
| 2011/0182174 A1 | 7/2011 | Pi et al. |
| 2011/0206155 A1 | 8/2011 | Fujimura et al. |
| 2011/0218005 A1 | 9/2011 | Jeon et al. |
| 2011/0235514 A1 | 9/2011 | Huang et al. |
| 2011/0250852 A1 | 10/2011 | Greene |
| 2011/0310767 A1 | 12/2011 | Hu |
| 2012/0058777 A1 | 3/2012 | Nguyen et al. |
| 2012/0063472 A1 | 3/2012 | Le Pallec et al. |
| 2012/0108284 A1 | 5/2012 | Patel et al. |
| 2012/0122477 A1 | 5/2012 | Sadek et al. |
| 2012/0135724 A1 | 5/2012 | Lewis et al. |
| 2012/0184222 A1 | 7/2012 | Seok |
| 2012/0213086 A1 | 8/2012 | Matsuura |
| 2013/0039200 A1 | 2/2013 | Park et al. |
| 2013/0089041 A1 | 4/2013 | Negus et al. |
| 2013/0089042 A1 | 4/2013 | Negus et al. |
| 2013/0089083 A1 | 4/2013 | Negus et al. |
| 2013/0095765 A1 | 4/2013 | Greene |
| 2013/0100897 A1 | 4/2013 | Negus |
| 2013/0121272 A1 | 5/2013 | Barbieri et al. |
| 2013/0130708 A1 | 5/2013 | Chhaya et al. |
| 2013/0272217 A1 | 10/2013 | Negus et al. |
| 2013/0273974 A1 | 10/2013 | Lea et al. |
| 2013/0288593 A1 | 10/2013 | Norin et al. |
| 2013/0293419 A1 | 11/2013 | Negus et al. |
| 2014/0120966 A1 | 5/2014 | Fischer et al. |
| 2014/0184455 A1 | 7/2014 | Lea et al. |
| 2014/0329562 A1 | 11/2014 | Proctor, Jr. et al. |
| 2015/0016362 A1 | 1/2015 | Negus et al. |
| 2015/0016561 A1 | 1/2015 | Negus et al. |
| 2015/0049720 A1 | 2/2015 | Negus et al. |
| 2015/0084826 A1 | 3/2015 | Lea et al. |
| 2015/0156777 A1 | 6/2015 | Negus et al. |
| 2015/0194999 A1 | 7/2015 | Lea et al. |
| 2015/0372738 A1 | 12/2015 | Negus et al. |
| 2016/0013831 A1 | 1/2016 | Lea et al. |

FOREIGN PATENT DOCUMENTS

| | | |
|---|---|---|
| EP | 2839693 | 2/2015 |
| EP | 2843863 A1 | 3/2015 |
| WO | WO 2007/146685 | 2/2007 |
| WO | 2008007375 A2 | 1/2008 |
| WO | WO 2011030960 | 3/2011 |
| WO | WO 2011080299 | 7/2011 |
| WO | WO 2013025413 A1 | 2/2013 |
| WO | WO 2013055947 A1 | 4/2013 |
| WO | WO 2013158237 A2 | 10/2013 |
| WO | WO 2014040083 A2 | 3/2014 |

OTHER PUBLICATIONS

Notice of Allowance in U.S. Appl. No. 13/632,993, dated Aug. 21, 2015.
Applicant Response and Amendment in U.S. Appl. No. 14/502,471, dated Jul. 2, 2015.
Office Action in U.S. Appl. No. 14/502,471, dated Jul. 22, 2015.
Office Action in U.S. Appl. No. 14/552,431, dated Jul. 14, 2015.
Applicant Response and Amendment in U.S. Appl. No. 14/552,431, dated Aug. 10, 2015.
Notice of Allowance in U.S. Appl. No. 14/552,431, dated Aug. 19, 2015.
Office Action in U.S. Appl. No. 14/686,674, dated Jul. 23, 2015.
Amendment and Response to Office Action in U.S. Appl. No. 14/686,674, dated Aug. 31, 2015.
Notice of Allowance in U.S. Appl. No. 14/686,674, dated Oct. 5, 2015.
Office Action in U.S. Appl. No. 14/688,550, dated Jul. 29, 2015.
Extended European Search Report in European Patent Application No. 12824072.8, dated Jul. 15, 2015.
"AccessGate—RAN Optimization for Mobile Backhaul Systems," Product Data Sheet, Memotec, 2009, Montreal, Quebec, Canada, 2 pages.
"Advances in Backhaul Synchronization—Maximizing ROI," Application Brief, Symmetricom Inc., 2008, 6 pages.
"Carrier Ethernet Services Overview," Presentation, MEF, Aug. 2008, 32 pages.
"Clock Distribution and Synchronization over Ethernet: IEEE1588v2 and SyncE," Presentation, VITESSE, Sep. 2009, 9 pages.
"Clock Synchronization in Carrier Ethernet Networks—Synchronous Ethernet and 1588v2 on Juniper Networks MX Series 3D Universal Edge Routers," White Paper, Juniper Networks, Inc., 2010, 11 pages.
"DAN2400-PTP—Open SoC Platform for Sub-6GHz Wireless Point-to-Point Systems," DesignArt Networks, Jul. 2008, 2 pages.
"Doubling Capacity in Wireless Channels," Provigent Inc., 2008, 3 pages.
"Evolving Microwave Mobile Backhaul for Next-Generation Networks," White Paper, NEC Corp., Feb. 2008, 4 pages.

(56) References Cited

OTHER PUBLICATIONS

"GainSpan GS1011M Low Power Wi-Fi® Module Family," Product Brief—Preliminary, GainSpan Corp., 2009, 2 pages.
"HMC536MS8G / 536MS8GE—GaAs MMIC Positive Control T/R Switch, DC—6 GHz," Data Sheet, Switches—SMT, Hittite Microwave Corp., 2008, pp. 10.295-10.299.
"IEEE 1588v2 (Precision Time Protocol) Testing," Application Note, IXIA, Dec. 2009.
"Information Technology—Open Systems Interconnection—Basic Reference Model: The Basic Model," International Standard, ISO/IEC 7498-1, Second Edition Nov. 15, 1994, Corrected and Reprinted Jun. 15, 1996, 68 pages.
"MGA-21108—Broadband Fully Integrated Matched Low-Noise Amplifier MMIC," Data Sheet, Avago Technologies, Aug. 2009, 21 pages.
"MGA-22003—2.3-2.7 GHz 3×3mm WiMAX/WiBro and WiFi Linear Amplifier Module," Data Sheet, Avago Technologies, Mar. 2010, 15 pages.
"MGA-23003—3.3-3.8 GHz 3×3mm WiMAX Power Amplifier," Data Sheet, Avago Technologies, Mar. 2010, 16 pages.
"MGA-25203—5.1-5.9GHz 3×3mm WiFi and WiMAX Power Amplifier," Data Sheet, Avago Technologies, Mar. 2010, 14 pages.
"MGA-43328—High Linearity Wireless Data Power Amplifier for 2.5 to 2.7 GHz Applications," Application Note, Avago Technologies, Apr. 2010, 10 pages.
"MGA-43328—(2.5-2.7) GHz 29dBm High Linearity Wireless Data Power Amplifier," Data Sheet, Avago Technologies, Mar. 2010, 19 pages.
"MGA-645T6—Low Noise Amplifier with Bypass/Shutdown Mode in Low Profile Package," Data Sheet, Avago Technologies, Nov. 2009, 16 pages.
"MGA-655T6—Low Noise Amplifier with Bypass Mode in Low Profile Package," Data Sheet, Avago Technologies, Nov. 2009, 14 pages.
"MGA-675T6—Low Noise Amplifier with Shutdown Mode in Low Profile Package for 4.9-6 GHz Application," Data Sheet, Avago Technologies, Nov. 2009, 16 pages.
"Part 11: Wireless LAN Medium Access Control (MAC) and Physical Layer (PHY) Specifications—Amendment 5: Enhancements for Higher Throughput," IEEE Standard for Information Technology—Telecommunications and Information Exchange Between Systems—Local and Metropolitan Area Networks—Specific Requirements, IEEE Computer Society, IEEE Std 802.11, Sep. 2009, 536 pages.
"Part 11: Wireless LAN Medium Access Control (MAC) and Physical Layer (PHY) Specifications," IEEE Standard for Information Technology—Telecommunications and Information Exchange Between Systems—Local and Metropolitan Area Networks—Specific requirements, IEEE Computer Society, IEEE Std 802.11, Jun. 2007, 1233 pages.
"Part 16: Air Interface for Fixed and Mobile Broadband Wireless Access Systems—Amendment 2: Physical and Medium Access Control Layers for Combined Fixed and Mobile Operation in Licensed Bands and Corrigendum 1," IEEE Standard for Local and Metropolitan Area Networks, IEEE Computer Society and the IEEE Microwave Theory and Techniques Society, IEEE Std 802.16e-2005 and IEEE Std 802.16-2004/Cor1-2005, Feb. 2006, 864 pages.
"Part 16: Air Interface for Fixed Broadband Wireless Access Systems," IEEE Standard for Local and Metropolitan Area Networks, IEEE Std 802.16, IEEE Computer Society and the IEEE Microwave Theory and Techniques Society, Oct. 2004, 895 pages.
"PC203-PC203-10—Basestation PHY Processor," Wireless Communications Processors, Product Brief, picoChip Flexible Wireless, 2008, 4 pages.
"SC-FDMA—Single Carrier FDMA in LTE," Data Sheet, IXIA Corp., Nov. 2009, 16 pages.
"Spectrum Sharing: The Promise and the Reality", Rysavy Research, LLC, White Paper, Jul. 2012, pp. 1-12, available at http://www.rysavy.com.
"Technical Report: Electromagenetic Compatibility and Radio Spectrum Matters (ERM); System Reference Document (SRdoc); Mobile Broadband Services in the 2 300 MHz-2 400 MHz frequency band under Licensed Shared Access Regime", ETSI TR 103 113 V1.1.1 (Jul. 2013), European Telecommunications Standards Institute, France, 2013, pp. 1-37.
"Understanding MPLS-TP and Its Benefits," White Paper, Cisco Systems Inc., 2009, 6 pages.
"WiMAX/WiBro RF MxFE Transceiver, AD9352," Data Sheet, Analog Devices, 2007.
"WiMAX RF MxFE Transceiver, AD9352-5," Data Sheet, Analog Devices, 2008.
"WiMAX RF MxFE Transceiver, AD9353," Data Sheet, Analog Devices, 2007.
"WiMAX/WiBro RF MxFE MISO Transceiver, AD9354," Data Sheet, Analog Devices, 2008-2009.
"WiMAX/WiBro RF MxFE MISO Transceiver, AD9355," Data Sheet, Analog Devices, 2008-2009.
"WiMAX/BWA/WiBRO/LTE RF MxFE 2×2 MIMO Transceiver, AD9356," Data Sheet, Analog Devices, 2010.
"WiMAX/BWA/LTE RF MxFE 2×2 MIMO Transceiver, AD9357," Data Sheet, Analog Devices, 2010.
Baum, D.S. et al., "An Interim Channel Model for Beyond-3G Systems—Extending the 3GPP Spatial Channel Model (SCM)," IEEE, Vehicular Technology Conference, vol. 5, 2005, pp. 3132-3136.
Beller, D. et al., "MPLS-TP—The New Technology for Packet Transport Networks," Alcatel-Lucent Deutschland AG, Stuttgart, 2009, 11 pages.
Chundury, R., "Mobile Broadband Backhaul: Addressing the Challenge," Planning Backhaul Networks, Ericsson Review, 2008, pp. 4-9.
Conrat, J-M. et al., "Typical MIMO Propagation Channels in Urban Macrocells at 2 GHz," EURASIP Journal on Wireless Communications and Networking, vol. 2007, Iss. 2, Jan. 2007, 9 pages.
Coon, J.P. et al., "Adaptive Frequency-Domain Equalization for Single-Carrier Multiple-Input Multiple-Output Wireless Transmissions," IEEE Transactions on Signal Processing, vol. 53, No. 8, Aug. 2005, pp. 3247-3256.
Coon, J.P. et al., "An Investigation of MIMO Single-Carrier Frequency-Domain MMSE Equalization," Centre for Communications Research, University of Bristol, Sep. 2002, 4 pages.
Durgin, G.D., "Wideband Measurements of Angle and Delay Dispersion for Outdoor and Indoor Peer-to-Peer Radio Channels at 1920 MHz," IEEE Transactions on Antennas and Propagation, vol. 51, No. 5, May 2003, pp. 936-944.
Falconer, D.D. et al., "Broadband Wireless Using Single Carrier and Frequency Domain Equalization," Invited Overview Paper for WPMC '02, Honolulu, Oct. 2002, 10 pages.
Falconer, D.D. et al., "Frequency Domain Equalization for Single-Carrier Broadband Wireless Systems," Wideband Wireless Access Technologies to Broadband Internet, IEEE Communications Magazine, Apr. 2002, pp. 58-66.
Frost, D. et al., "MPLS Transport Profile Data Plane Architecture," Internet Engineering Task Force, RFC 5960, Aug. 2010, 16 pages.
Gao, S.C. et al., "Dual-polarized slot coupled planar antenna with wide bandwidth," IEEE Trans. Antennas and Propagation, vol. 51, No. 3, pp. 441-448, 2003.
Garner, G.M., "IEEE 1588 Version 2," ISPCS Ann Arbor '08, Sep. 2008, 89 pages.
Hentschel, T. et al., "The Digital Front-End—Bridge Between RF and Baseband-Processing," Software Defined Radio: Enabling Technologies by Walter Tuttlebee, Chapter 6, Jun. 2002, 58 pages.
Lashkarian, N., "Reconfigurable Digital Front-end Architecture for Wireless Base-Station Transmitters: Analysis, Design and FPGA Implementation," Seminar Presentation, University of California, Berkeley, Apr. 2006, 86 pages.
Nathanzon, G. et al., "Cost-Effective Backhaul Alternatives for WiMAX Networks: Challenges & Solutions," Provigent Inc., Jun. 2008, 16 pages.
Padhi, S.K. et al., "A Dual Polarized Aperture Coupled Circular Patch Antenna Using a C-Shaped Coupling Slot," IEEE Transactions on Antennas and Propagation, vol. 51, No. 12, Dec. 2003, pp. 3295-3298.

(56) References Cited

OTHER PUBLICATIONS

Pancaldi, F. et al., "Single-Carrier Frequency Domain Equalization—A Focus on Wireless Applications," IEEE Signal Processing Magazine, Sep. 2008, 22 pages.
Pozar, D.M. et al., "Improved coupling for aperature-coupled microstrip antennas," Electron. Lett., vol. 27, No. 13, pp. 1129-1131, 1991.
Pozar, D.M., "A microstrip antenna aperature-coupled to a microstripline," Electron. Lett., vol. 21, No. 2, pp. 49-50, 1985.
Sharony, J., "Introduction to Wireless MIMO—Theory and Applications," CEWIT—Center of Excellence in Wireless and Informational Technology, Stony Brook University, IEEE LI, Nov. 15, 2006, 63 pages.
Soffer, R., "Microwave Wireless Backhaul for LTE Networks—Meeting the Rapidly-Increasing Demand for Mobile Data," Provigent Inc., Jan. 2010, 18 pages.
Soffer, R., "ProviBand—Next Generation Wireless Backhaul Technology," Technical White Paper, Provigent Inc., Jan. 2006, 13 pages.
Stuber, G.L. et al., "Broadband MIMO-OFDM Wireless Communications," Invited Paper, Proceedings of the IEEE, vol. 92, No. 2, Feb. 2004, pp. 271-294.
Tubbax, J., "OFDM Versus Single Carrier with Cyclic Prefix: A System-based Comparison for Binary Modulation," IMEC, Belgium, Jan. 2011, 4 pages.
"TV Whitespaces" reuse: A detailed description of the program is provided in FCC order FCC-10-174A1, and the rules for unlicensed devices that operate in the TV bands are set forth in 47 C.P.R. §§ 15.701-.717. See Title 47—Telecommunication; Chapter I—Federal Communications Commission; Subchapter A—General, Part 15—Radio Frequency Devices, Subpart H—Television Band Devices (Available online at http://www.ecfr.gov/cgi-bin/text-idx?c=ecfr&SID=30f46f0753577b10de41d650c7adf941&rgn=div6&view=text&node=47:1.0.1.1.16.8&idno=47:1.0.1.1.16.8&idno=47, retrieved Feb. 25, 2015).
Notice of Allowance in U.S. Appl. No. 13/212,036, dated Apr. 3, 2012.
Office Action in U.S. Appl. No. 13/271,051, dated Jun. 14, 2013.
Amendment and Response to Office Action in U.S. Appl. No. 13/271,051, filed Dec. 16, 2013.
Notice of Allowance in U.S. Appl. No. 13/271,051, dated Feb. 3, 2014.
Office Action in U.S. Appl. No. 13/371,346, dated Sep. 26, 2012.
Amendment and Response to Office Action in U.S. Appl. No. 13/371,346, filed Dec. 21, 2012.
Applicant Initiated Interview Summary in U.S. Appl. No. 13/371,346, filed Jan. 10, 2013.
Supplemental Amendment and Response to Office Action in U.S. Appl. No. 13/371,346, filed Jan. 25, 2013.
Notice of Allowance in U.S. Appl. No. 13/371,346, dated Apr. 2, 2013.
Office Action in U.S. Appl. No. 13/371,366, dated Apr. 19, 2012.
Amendment and Response to Office Action in U.S. Appl. No. 13/371,366, dated Jul. 19, 2012.
Notice of Allowance in U.S. Appl. No. 13/371,366, dated Sep. 21, 2012.
Office Action in U.S. Appl. No. 13/415,778, mailed Apr. 26, 2012.
Applicant Initiated Interview Summary in U.S. Appl. No. 13/415,778, filed Jul. 5, 2012.
Amendment and Response to Office Action in U.S. Appl. No. 13/415,778, dated Jul. 26, 2012.
Notice of Allowance in U.S. Appl. No. 13/415,778, mailed Sep. 17, 2012.
Office Action in U.S. Appl. No. 13/448,294, dated on Jun. 21, 2012.
Amendment and Response to Office Action in U.S. Appl. No. 13/448,294, dated Sep. 21, 2012.
Notice of Allowance in U.S. Appl. No. 13/448,294, dated Oct. 23, 2012.
Notice of Allowance in U.S. Appl. No. 13/536,927, dated Feb. 19, 2013.
Notice of Allowance in U.S. Appl. No. 29/429,634 dated Dec. 5, 2013.
Office Action in U.S. Appl. No. 13/632,961, dated May 6, 2014.
Office Action in U.S. Appl. No. 13/632,993, dated Jan. 30, 2015.
Notice of Allowance in U.S. Appl. No. 13/633,028, dated May 1, 2014.
Office Action in U.S. Appl. No. 13/645,472, dated May 24, 2013.
Amendment and Response to Office Action in U.S. Appl. No. 13/645,472, dated Nov. 25, 2013.
Supplemental Amendment and Response to Office Action in U.S. Appl. No. 13/645,472, dated Jan. 27, 2014.
Notice of Allowance in U.S. Appl. No. 13/645,472, dated Apr. 4, 2014.
Notice of Allowance in U.S. Appl. No. 13/748,544, dated Aug. 15, 2014.
Notice of Allowance in U.S. Appl. No. 13/898,429, dated Apr. 8, 2014.
Office Action in U.S. Appl. No. 13/934,175, dated Oct. 15, 2014.
Notice of Allowance in U.S. Appl. No. 14/197,158, dated Sep. 3, 2014.
Examiner Initiated Interview Summary in U.S. Appl. No. 14/197,158, filed Sep. 3, 2014.
Examiner Initiated Interview Summary in U.S. Appl. No. 14/199,734, dated Jun. 13, 2014.
Notice of Allowance in U.S. Appl. No. 14/199,734, dated Jun. 13, 2014.
Notice of Allowance in U.S. Appl. No. 14/336,958, dated Nov. 26, 2014.
Preliminary Amendment and Response in U.S. Appl. No. 14/337,744, dated Aug. 20, 2014.
Applicant Response and Amendment in U.S. Appl. No. 14/337,744, dated Oct. 6, 2014.
Notice of Allowance in U.S. Appl. No. 14/337,744, dated Jan. 12, 2015.
Office Action in U.S. Appl. No. 14/502,471, dated Jan. 5, 2015.
Notice of Allowance in U.S. Appl. No. 14/498,959, dated Jan. 12, 2015.
Office Action in U.S. Appl. No. 14/552,431, dated Mar. 12, 2015.
International Search Report and Written Opinion for PCT Application No. PCT/US2012/049948 dated Oct. 22, 2012.
International Search Report and Written Opinion for PCT Application No. PCT/US2012/059797 dated Jan. 2, 2013.
International Search Report and Written Opinion for PCT Application No. PCT/US2013/029731 dated May 13, 2013.
International Search Report and Written Opinion in PCT Application No. PCT/US013/48782, dated Jul. 29, 2013.
Extended European Search Report in European Patent Application No. 14177662.5, dated Feb. 3, 2015.
U.S. Appl. No. 14/552,431, filed Nov. 24, 2014.
U.S. Appl. No. 14/632,624, filed Feb. 26, 2015.
U.S. Appl. No. 14/624,365, filed Feb. 17, 2015.
Zarikoff, B.W., et al. "Detection of Pulsed Radar in a Time Division Duplexed System," Vehicular Technology Conference (VTC Spring), 2011, IEEE 73rd.
Office Action in U.S. Appl. No. 14/151,190 dated Mar. 28, 2014.
Applicant Initiated Interview Summary in U.S. Appl. No. 14/151,190, dated May 29, 2014.
Amendment and Response to Office Action in U.S. Appl. No. 14/151,190, dated Jun. 30, 2014.
Examiner Initiated Interview Summary in U.S. Appl. No. 14/151,190, dated Oct. 14, 2014.
Notice of Allowance in U.S. Appl. No. 14/151,190, dated Oct. 14, 2014.
Office Action in U.S. Appl. No. 14/098,456 dated Apr. 4, 2014.
Amendment and Response to Office Action in U.S. Appl. No. 14/098,456, dated Jul. 7, 2014.
Amendment and Response to Office Action in U.S. Appl. No. 14/098,456, dated Jul. 15, 2014.
Office Action in U.S. Appl. No. 14/098,456, dated Jul. 30, 2014.
Amendment and Response to Office Action in U.S. Appl. No. 14/098,456, dated Sep. 26, 2014.
Notice of Allowance in U.S. Appl. No. 14/098,456, dated Oct. 8, 2014.

(56) References Cited

OTHER PUBLICATIONS

Amendment After Notice of Allowance in U.S. Appl. No. 14/098,456, dated Jan. 8, 2015.
Notice of Allowance in U.S. Appl. No. 13/934,175, dated May 28, 2015.
Partial European Search Report in European Patent Application No. 12839752.8, dated Jun. 16, 2015.
Notice of Allowance in U.S. Appl. No. 14/632,624, dated May 26, 2015.
U.S. Appl. No. 14/686,674, filed Apr. 14, 2015.
U.S. Appl. No. 14/688,550, filed Apr. 16, 2015.
Notice of Allowance in U.S. Appl. No. 14/688,550, dated Dec. 4, 2015.
Notice of Allowance in U.S. Appl. No. 14/837,797, dated Dec. 30, 2015.
Notice of Allowance in U.S. Appl. No. 14/839,018, dated Dec. 21, 2015.
Notice of Allowance in U.S. Appl. No. 14/950,354, dated Feb. 17, 2016.

* cited by examiner

FULL DUPLEX RADIO TRANSCEIVER WITH REMOTE RADAR DETECTION

CROSS-REFERENCE TO RELATED APPLICATIONS

The present application is a continuation application of U.S. patent application Ser. No. 14/151,190, filed on Jan. 9, 2014, which is a continuation-in-part application of U.S. patent application Ser. No. 13/645,472, filed on Oct. 4, 2012, now U.S. Pat. No. 8,811,365, which is a continuation of U.S. patent application Ser. No. 13/371,366, filed on Feb. 10, 2012, now U.S. Pat. No. 8,311,023, which is a continuation of U.S. patent application Ser. No. 13/212,036, filed on Aug. 17, 2011, now U.S. Pat. No. 8,238,318, the disclosures of which are hereby incorporated herein by reference in their entirety. Also, U.S. patent application Ser. No. 14/151,190, filed on Jan. 9, 2014, also claims priority to U.S. Provisional Patent Application Ser. No. 61/857,661, filed Jul. 23, 2013, entitled "Intelligent Backhaul Radio with Improved Radar Detection Capability", the entirety of which is hereby incorporated by reference.

The present application is also related to U.S. patent application Ser. No. 13/536,927, filed Jun. 28, 2012 and now U.S. Pat. No. 8,467,363, U.S. patent application Ser. No. 13/609,156, filed Sep. 10, 2012 and now U.S. Pat. No. 8,422,540, U.S. patent application Ser. No. 13/767,796, filed Feb. 14, 2013 and now U.S. Pat. No. 8,638,839, U.S. patent application Ser. No. 13/898,429, filed May 20, 2013 and now U.S. Pat. No. 8,824,442, and U.S. Provisional Patent Application Ser. No. 61/910,194, filed Nov. 29, 2013, the disclosures of which are hereby incorporated herein by reference in their entirety.

BACKGROUND

1. Field

The present disclosure relates generally to data networking and in particular to radar detection with a radio transceiver for connecting remote edge access networks to core networks.

2. Related Art

Connections to remote edge access networks from core networks are often achieved with wireless radio, wireless infrared, and/or copper wireline technologies. Radio, especially in the form of cellular or wireless local area network (WLAN) technologies, is particularly advantageous for supporting mobility of data networking devices. However, cellular base stations or WLAN access points inevitably become very high data bandwidth demand points that require continuous connectivity to an optical fiber core network. When data aggregation points, such as cellular base station sites, WLAN access points, or other local area network (LAN) gateways, cannot be directly connected to a core optical fiber network, then an alternative connection, using, for example, wireless radio or copper wireline technologies, must be used. Such connections are commonly referred to as "backhaul." The array of network backhaul and other high throughput radio applications include point-to-point, point-to-multipoint, networks of multiple point-to-point and multipoint links, ad hoc, ring, self-organizing and mesh networks. These network architectures, often using directive antennas, are needed to support wireless last mile hops and wireless backhaul applications that are used to bring high throughput services to cellular telephone systems and broadband services to enterprises and the home.

Increasingly, high throughput services to consumers and business are becoming one of the cornerstones of future economic vitality. It is very efficient to support these high-demand needs using frame-based transmission links, and particularly so with very high duty factor transmission frequency domain duplexing (FDD). A frame-based system refers to radios with continuous or near-continuous time transmission where time is divided into frames. Each frame carries channel estimation and control information, as well as multiple opportunities to stuff incoming packet-based data onto the frame. When there is no network data available, the frame is transmitted with dummy data blocks. This allows the dropping of incoming data into the data blocks with very low latency and high reliability. The low latency comes from the fact that the link is already running and just needs to substitute the incoming data for the dummy data. The high reliability comes from the fact that the link can be set up and maintained over a period of time that is longer than what would be efficient in a packet radio link. This view of frame-based operation is consistent with the definition of "frame based" in the European ETSI standard EN 301 893.

Radio signals can interfere with radar reception. Because the protection of radar operation is important, regulatory bodies control channel access of radio systems that share the band with radars and set up radar signal level limits for detection of various types of radar signals. In many regulatory regions, a transmitted radar signal that is detected by a radio's radar detector at −64 dBm is considered too close to the radio system and the radio system must cease transmitting on that channel and move to another channel. A channel is the occupied bandwidth of the data transmission stream over the RF link. But a channel may comprise more than one noncontiguous part where each part can have a different center frequency and occupied bandwidth. The channel frequency of each part is its center frequency.

Although effective for high performance communications, FDD frame-based radio operation makes detection of radar signals using conventional methods impossible. In effect, frame-based transmission is similar to circuit switched operation of the older telephone circuit switching technology. In an FDD link, frame based transmitters can operate at up to 100% transmit duty factor because the responses for each channel arrive in the other channel—a single transceiver can operate with up to 100% transmit duty factor in one channel and up to 100% receive duty factor in another channel, while the transceiver on the other end of the communication link does the opposite on the channels. Various implementations may use less than 100% duty factor to, for example, sense the channel to satisfy a channel sharing regulation or system wide self-interference requirements. But, in each case, the duty factor is significantly higher than a packet radio system and can approach 100% in many cases. Thus, with typical FDD radios, the transmitters on both ends of an FDD link usually transmit together coincident in time for at least some fraction of every frame. When the transmit duty factor is high, this means that radar detection for one or both of the transmit directions is preferably performed within a fraction of every frame that includes this fraction where both ends of an FDD link transmit together coincident in time.

In bands that require radar detection, there is typically a sequence of stages that a transmitter goes through before and at the beginning of operation. In the first stage, prior to operation, the transmitter determines whether the channel is clear of radar transmissions. The regulatory agencies call this stage Channel Availability Check (CAC). In CAC, the radar detector informs the transmitter that a channel cannot be used if certain types of radar are detected. If such radars are detected, the channel is typically off limits for 30 minutes, at which time another CAC must be performed. The next stage is link operation. In the link operation stage, the receiver detects and acquires the transmission and a round trip connection is made (for full duplex). Often, the receiver and transmitter negotiate an operating frequency. During this period of time, which may be part of a radio channel "bootstrap" sequence, radar monitoring may continue. Typically, there is a 200 ms regulatory requirement for a transmitter to stop transmitting after a radar pulse sequence occurs on a channel. If the bootstrap sequence is a significant duration on the scale of 200 ms, then, under most regulatory requirements, radar monitoring is still needed. After the bootstrap sequence, normal run-mode operation can occur. During this time, in-service monitoring for the radar occurs. The in-service monitoring requires the detection of the presence of certain types of radar on an operating channel and closing the transmission within 200 ms (i.e. the required close time) of the end of the radar pulse train that is used to certify this operation in testing. It should be noted that over the course of a radio's operating time, it may re-enter the bootstrap mode and the normal run-mode operation multiple times, particularly if the synchronization between the radios is disrupted, or even as a normal maintenance operation.

One problem with existing networks is that when the transmitter is transmitting, the high signal level swamps out the receive signals for typical receivers that are located in close proximity to the transmitter, thereby limiting the ability for a radar detector co-located with the transmitter to detect a radar signal.

Packet radio systems, such as WiFi, handle this by testing their radar detection operation while transmitting at low duty factor, typically much less than 40% transmission period. These packet radio systems detect the radar with a co-located detector at the transmitter while the transmitter is not sending and the radio is available to receive or is receiving. The channel monitoring applies to the next time the transmitter operates. If a WiFi system operates with a transmit traffic load such that it uses a high duty factor, it can miss radar detections.

US20070264935 to Behzad Mohebbi, assigned to Nextivity, describes a bi-direction FDD link for use in the 5 GHz USA UNII-2 band, which requires radar detection. Because the Mohebbi disclosure is bi-directional in nature, it first transmits FDD in one direction on frequency channel 1, while receiving on frequency channel 2, then switches so that the same radio that was transmitting on channel 1 now transmits FDD on channel 2 and receives on frequency channel 1. Although the radar detector for the local transmitter is co-located with the transmitter, the detection is performed on the transmitter channel during the half cycle period that the transceiver is receiving on that channel for the forthcoming transmission. In this way, the Mohebbi disclosure is closely related to WiFi, which performs radar detection when in receive mode for forthcoming transmissions; Mohebbi differs in that it is not performing radar detection for the transmitter that is operating on the other end of the link. Mohebbi is more accurately described as a pair of TDD links, each on one frequency, which have anti-phase transmit/receive cycles. In other words, there is a TDD transmission between radios on channel 1 and another on channel 2, but at each transceiver, it transmits on channel 1 while receiving on channel 2 and vice versa. In Mohebbi, each transceiver transmits a first portion to the other on a frequency 1, while receiving from the other on frequency 2, and radar detecting on a frequency 2; and, each transceiver transmits a second portion to the other on the frequency 2, while receiving from the other on the frequency 1, and radar detecting on frequency 1. Therefore, each transceiver in Mohebbi performs radar detection on both frequency 1 and frequency 2 during the receive period for that frequency to enable the transmission on that frequency on the opposite TDD cycle, similar to the way a WiFi packet radio radar detector operates. It cannot perform radar detection on the transmit channel while the transmitter is transmitting. The Mohebbi system is also inferior in radio performance because it requires a clear channel available in both directions for two frequencies, which is very difficult to achieve from a frequency planning point of view. Additionally, the UNII-2 band is a commonly used unlicensed band that has no controls on interference. The best performance occurs in channels that show the lowest interference levels; interference is a receiver phenomenon. The level of interference measured at the transmitter is uncorrelated to that measured at the receiver simply because there is different propagation from an arbitrarily placed interference source to each side. It is only the interference level at the receiver and not the transmitter that matters because that is what causes reduced signal to interference levels. If a transceiver must receive at two frequencies to maintain a link, it must find two channels that are relatively free of interference to operate, making it much harder to create a good link; in a probabilistic interference setting, this requirement, at a minimum, squares the difficulty of operation. Moreover, in the system of Mohebbi these two channels must be clear at both transceivers on either end of the link and for backhaul radios separated by considerable distances this also squares the difficulty of operation because the interference environments at each end of the link are likely quite different. Also, since the receiving period is the time when the radar detection for the transmitter must be performed in Mohebbi, the transmit and receive channels for one of the pair of "first and second portions" must be the same. That is why it is effectively a pair of TDD channels.

In a WiFi application, the transmissions are packetized and the transmitters generally operate at a low duty factor. In fact, when the transmitters are tested for regulatory compliance for radar detection, they operate at less than a 40% duty factor. Packet radio systems are able to detect radars with the radar detector co-located with the transmitter because they detect the radar signals during the typically greater-than-60% of the time the transmitter is not transmitting.

Thus, the frame-based FDD system has particular challenges for performing radar detection under the various regulatory requirements around the world because, unlike packet-based transmitters such as WiFi radios that can operate at a modest duty factor, the frame-based transmitter is active at high duty factors. There is no opportunity for performing in-service monitoring local to the transmitter under the conventional art because the detection mechanism must listen for signals at −64 dBm while the transmitter is operating on the same channel at, for example, +30 dBm or higher and at nearly 100% duty factor.

By most regulations, a channel which requires radar detection cannot be occupied before completing a 60 second listen period for radars (CAC). If a radio transceiver is forced to vacate its operating channel and it does not have another channel queued up that it has already performed a successful CAC on, it will have to remain off the air for at least 60 seconds. An outage of this length is unacceptable in many applications.

Also, it is often a regulatory requirement that when a radar is detected in a channel, at least 80% of the occupied bandwidth of the channel must be vacated and must remain unused by the detecting system for at least 30 minutes, despite the actual receiver operating bandwidth of the radar. But for wideband devices, as are often found in high-duty-factor links that achieve high throughput, this unduly punishes a system for spreading its channel power over a wider bandwidth, thus reducing its spectral power density.

SUMMARY

The following summary of the invention is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Some embodiments of the claimed invention are directed to point-to-point links, a point-to-two-point link, general point-to-multipoint, networks of multiple point-to-point and multipoint links, ad hoc, self-organizing and mesh networks in which a radar detector is co-located with the receiver of the transmission in the channel on which it is detecting. This approach can outperform a radar detector that is co-located at the transmitter.

In an additional exemplary embodiment, a higher degree of directionality for the transmit signal antenna than for the radar detection antenna is used, which biases the detection operation in favor of the radar detector so that the radar will be detected at the receiver at a greater range than it will be interfered with by the radio transmitter. In an additional exemplary embodiment, the radio link uses a directional antenna for the radio link transmitter and an omnidirectional antenna or antenna that is omnidirectional in azimuth is used for the radar detector and it is taught that other combinations work well also.

Embodiments of the invention are applicable to both frequency division duplex (FDD) operation and time division duplex (TDD) operation of the radio link. Performance can be improved with an FDD link using a radar detector co-located with the receiver on the channel on which it is detecting, because the detector can listen for the radar with 100% duty factor. This high-duty factor availability of the radar detector creates a peak-detection capability over time that insures the detector is exposed to the largest radar signal of the time varying channel, mitigating the losses from multipath fading due to channel variations and a rotating radar detection antenna.

According to an aspect of the invention, a wireless communications system is disclosed that includes a first transceiver, wherein the first transceiver includes a first transmitter, a first receiver, and a first radar detector, and wherein the first transmitter transmits on a first transmit channel; a second transceiver, wherein the second transceiver includes a second transmitter and a second receiver, and wherein the second transmitter transmits on a second transmit channel; wherein the first receiver receives from the second transmitter on the second transmit channel and the second receiver receives from the first transmitter on the first transmit channel; wherein the first transmit channel is within a first transmit frequency band and the second transmit channel is within a second transmit frequency band; wherein the first radar detector is configured to detect radars within a first radar detection frequency range that includes at least part of the second transmit frequency band; wherein the first radar detector is configured to detect radars within at least a first time period, the first time period comprising at least a period of time when the first transmitter and the second transmitter both transmit coincident in time; wherein the first radar detector communicates at least a first radar detection result via the first transmitter to the second receiver; and wherein the first radar detection result is an input to a controller associated with the second transmitter.

The first radar detector may be configured to be not transmit-impaired by the second transmitter when the second transmitter transmits, at least in part due to a physical separation of the first radar detector and the second transmitter.

The first radar detector may be configured to be not transmit-impaired by the first transmitter when the first transmitter transmits, at least in part due to a physical separation of the first radar detector and the first transmitter.

The first radar detector may be configured to be not transmit-impaired by the first transmitter when the first transmitter transmits, at least in part due to an the antenna pattern of the first radar detector relative to the antenna pattern of the first transmitter.

The controller associated with the second transmitter may cause the second transmitter to adjust at least one adjustable parameter associated with the second transmit channel.

The at least one adjustable parameter associated with the second transmit channel may be a transmit power of the second transmitter.

The at least one adjustable parameter associated with the second transmit channel may be a center frequency or a channel bandwidth.

The transmit power of the second transmitter after an adjustment may be at a level below that of a regulatory limit for transmit power within a channel for which a radar has been detected.

The first radar detection frequency range may be at least 80% of the bandwidth of the second transmit channel.

The first radar detection frequency range may further include at least 80% of the bandwidth of an alternate channel that is different from the second transmit channel.

The first radar detection result may be communicated within a radar detection message, control frame or status that at least indicates whether or not at least one radar has been detected within the first radar detection frequency range.

The first radar detection result may be communicated within a radar detection message, control frame or status that at least indicates whether or not at least one radar has been detected within the second transmit channel.

The radar detection message, control frame or status may indicate at least one or both of the bandwidth or center frequency of the at least one detected radar within the first radar detection frequency range.

The part of the first time period when at least the first transmitter and the second transmitter both transmit coincident in time may be 100% of the first time period for which the first radar detector is configured to at least detect radars.

The controller associated with the second transmitter may cause an adjustment or a non-adjustment of at least one adjustable parameter associated with the second transmit channel depending on the first radar detection result.

The first transmit frequency band may overlap in frequency with the second transmit frequency band. The first radar detection frequency range may not overlap in frequency with the first transmit frequency band.

The first radar detection frequency range may be identical to or a subset of the second transmit frequency band.

The wireless communications system may further include a second radar detector; wherein the second radar detector is configured to detect radars within at least a second time period, the second time period including at least a period of time when the first transmitter and the second transmitter both transmit coincident in time; wherein the second radar detector is configured to detect radars within a second radar detection frequency range.

The first time period may overlap in time with the second time period.

The second radar detection frequency range may exclude the second transmit channel.

The second radar detection frequency range may include at least an alternate channel that is different from the second transmit channel.

The second radar detector may be within the first transceiver; wherein the second radar detector communicates at least a second radar detection result via the first transmitter to the second receiver; and wherein the second radar detection result is an input to the controller associated with the second transmitter.

The second radar detection result may be communicated within a radar detection message, control frame or status that at least indicates whether or not at least one radar has been detected within an alternate channel.

The second radar detector may be within the second transceiver; wherein the second radar detector communicates at least a second radar detection result via the second transmitter to the first receiver; and wherein the second radar detection result is an input to a controller associated with the first transmitter.

The second radar detection frequency range may be identical to or a subset of the first transmit frequency band.

The wireless communications system may further include a third radar detector within the second transceiver; wherein the third radar detector is configured to detect radars within at least a third time period, the third time period including at least a period of time when the first transmitter and the second transmitter both transmit coincident in time; wherein the third radar detector is configured to detect radars within a third radar detection frequency range; wherein the third radar detector communicates at least a third radar detection result via the second transmitter to the first receiver; and wherein the third radar detection result is an input to a controller associated with the first transmitter.

The wireless communications system may further include a cancellation circuit within the first transceiver, wherein the cancellation circuit is coupled to at least the first radar detector; and wherein the cancellation circuit adjusts a signal representative of the output of the first transmitter such that the adjusted signal in combination with a received signal for the first radar detector together result in a reduced level of first transmitter signal impairment to the first radar detector.

The wireless communications system may further include a second radio resource controller comprised within the second transceiver, wherein the second radio resource controller comprises the controller associated with the second transmitter; and wherein the second radio resource controller receives at least one additional link quality input as well as the first radar detection result to adjust at least one parameter associated with the second transmit channel.

The wireless communications system may further include a first radio resource controller comprised within the first transceiver, wherein the first radio resource controller comprises the controller associated with the first transmitter; and wherein the first radio resource controller receives at least one additional link quality input as well as the second radar detection result to adjust at least one parameter associated with the first transmit channel.

According to an aspect of the invention, a system is provided that includes a radio transmitter; and a radar detector to detect radar signals, wherein the radar detector is configured to detect radar on a radar detection listening frequency, the radar detector separated in distance from the radio transmitter such that the signal from the radio transmitter does not prevent the radar detector from detecting radar signals while the radio transmitter is emitting a transmit signal on the radar detection listening frequency, and wherein the radar detector is configured to communicate information to the radio transmitter if a radar is detected.

The radar detector may be a first radar detector and the system may further include a second radar detector to detect radar signals, wherein the second radar detector is configured to detect radar on a radar detection listening frequency, the second radar detector near enough to the radio transmitter such that signal from the radio transmitter prevents the second radar detector from detecting radar signals while the radio transmitter is emitting a transmit signal on the radar detection listening frequency, and wherein the second radar detector is configured to communicate information to the radio transmitter if a radar is detected.

The radio transmitter may operate at a transmit duty factor that is low enough that the second radar detector can detect radar. The second radar detector may perform radar detection listening on a transmit frequency of the radio transmitter prior to the radio transmitter emitting a signal on the radar detection listening frequency. The second radar detector may perform detection listening while the radio transmitter emits a signal on the radar detection listening frequency at a duty factor that is low enough that the second radar detector can detect radar.

The radar detector may perform radar detection listening while the radio transmitter emits a signal on the radar detection listening frequency. The second radar detector may perform radar detection listening while the radio transmitter emits a signal on the radar detection listening frequency at a duty factor that is low enough that the second detector can detect radar, and the first radar detector may perform radar detection listening while the radio transmitter emits a high duty factor signal on the radar detection listening frequency.

The second radar detector may perform radar detection listening on a frequency that is not the radio transmitter transmission frequency.

The radio transmitter may be a first radio transmitter and the system may further include a second radio transmitter that transmits on a different frequency than the first radio transmitter, and the second radar detector may perform radar detection listening on the transmit frequency of the first radio transmitter.

The first radar detector may receive from a less directive receive antenna pattern than the radio transmitter transmit antenna pattern.

According to another aspect of the invention, a system is provided that includes a plurality of transceivers, each of the plurality of transceivers comprising a receiver and a transmitter, and each of the plurality of transceivers having a radar detector co-located with the transmitter, wherein each radar detector operates in a different channel than the transmitter with which it is co-located.

The radar detector may communicate a radar detection status to at least one of the other of the plurality of transceivers.

Each radar detector may listen in a channel of a transmitter that is not the transmitter with which said radar detector is co-located. One radar detector may listen in a channel of a transmitter that is not the transmitter with which said radar detector is co-located and another radar detector may listen in a channel that is not used by any transmitters in the system.

The radio transmission term band refers to a range of frequencies for which operation is available. It may be the case that the operating channel, or occupied bandwidth of the transmission, entirely occupies the band, but more often, the operating channel occupies part of the band. It is often the case that a number of operating channels can occupy the band simultaneously. Furthermore, there are interference implications for operating channels to simultaneously occupy the band because even though they may be non-overlapping, there is limited filtering available that can prevent an impact that one transmission has on the reception of another if they are near each other. A band usually refers to an entity larger than a single channel, and the channel locations may be pre-designated so as to minimize potential overlap, or they may be arbitrarily placed on a grid that depends on the technology used. A radio may search for the best channel among available channels to determine the best one to use in the operating environment to get the desired performance. A sub-band refers to major splits of the band which get pre-designated for a purpose which is generally technology dependent, such as a sub-band for uplinks and a sub-band for downlinks, where the channels within these sub-bands get selected by the equipment. Sub-bands, if used, are also generally an entity larger than a channel and which comprise one or more channels. Most regulatory agencies identify bands or sub-bands that a specific set of rules apply to. More than one band may be used for equipment. In an exemplary embodiment, to get separation between uplink and downlink channels one band may be used for an uplink and another band used for a downlink. The bands may have different regulatory requirements.

One radar detector may listen in part of a band or sub-band of a transmitter that is not the transmitter with which said radar detector is co-located and another radar detector may listen in another part of the band or sub-band occupied by a transmitter that is not the transmitter with which said radar detector is co-located.

At least one of the radar detectors may listen on a channel that is not occupied by a transmitter of the system for part of the time the at least one of the radar detectors listens.

The bandwidth of a radar detected by the radar detector is determined and only a bandwidth in the system related to the bandwidth of the detected radar is vacated. The related bandwidth in the system may be the same as the bandwidth of the detected radar. The related bandwidth in the system may be one selected from the group consisting of half, double and quadruple the bandwidth of the detected radar.

According to a further aspect of the invention, a system is provided that includes a plurality of transceivers, the plurality of transceivers comprising a first transceiver, the first transceiver comprising a receiver and a transmitter and a first radar detector co-located with the transmitter, wherein the first radar detector first operates in a transmit channel of the transmitter of the first transceiver and then operates in a transmit channel of another of the plurality of transceivers.

A radar detector serves the purpose of detecting the presence of radars that would be interfered with by the transmitter that the radar detector is working for. The radar detector produces a radar detection result. The radar detection result can be polled or can be pushed from the radar detector. One example is status derived from a signal line such as a general purpose I/O line or logic signal that indicates that a radar is present, or is not present, and if it is present, it may indicate some information about the nature of the radar measurement results that it made, such as the radar center frequency, radar bandwidth, or category of radar type. Another example is a message or control frame sent over a communications interface from the radar detector to some other controller entity with the system that comprises fields that describe if a radar is present, or is not present, and if it is present, it may indicate some information about the nature of the radar measurement results that it made, such as the radar center frequency, radar bandwidth, or category of radar type. This message can be used to make adjustments to at least one adjustable parameter of the transmitter the radar detector is working for such as the transmit channel number (or numbers), the transmit channel center frequency (or frequencies), the transmit channel bandwidth (or bandwidths), and the transmit channel power (or powers). That adjustment may be a result of the message or signal from the radar detector being converted in format and sent to a controller for the transmitter. The controller for the transmitter may also take several forms. If it is a simple controller, then upon seeing the message that the radar detection occurred in the occupied bandwidth of the transmitter, then the transmission in that bandwidth will be stopped. There is generally a regulatory requirement for how long a radio can take before the transmitter is prevented from further transmissions. A more complex form of control would be if a radio resource controller used the radar detector as an input along with another input (or inputs) such as described in U.S. patent application Ser. No. 13/645,472 or U.S. Provisional Patent Application Ser. No. 61/910,194 and incorporated herein to make decisions such as what the next course of action is besides preventing further transmissions in the channel where the radar detection occurred. An exemplary course of action would be to decide the next channel to go to or a different occupied bandwidth to use and to use the remaining allowed time on the air to communicate that information or negotiate the best alternative among the radios involved. The radio resource controller can utilize information about alternatives combined with the radar detection results to help determine the next step.

The first radar detector may be configured to communicate results of a radar detection status to a transmitter of at least one other transceiver of the plurality of transceivers.

The system may further include a second radar detector, the second radar detector configured to listen for radar on the transmit channel of the transmitter of the first transceiver. The second radar detector may communicate results of a radar detection status to control the transmitter of the first transceiver. An aggregation point of the system may use the information from the first radar detector and the second radar detector to determine radar detection results.

The system may further include a third detector, the third detector configured to listen for radar on the transmit channel of the transmitter of the first transceiver. The third radar detector may communicate results of radar detection status to control the transmitter of the first transceiver. An aggregation point of the system may use the information from the second radar detector and the third radar detector to determine radar detection results.

According to another aspect of the invention, a radio transceiver is disclosed that includes a receiver; a transmitter; a radar detector co-located with the transmitter, wherein the radar detector operates in a different channel than the transmitter with which it is co-located.

The radar detector may communicate information about a radar detection to another radio transceiver in communication with the radio transceiver.

The radar detector may listen in a channel of a transmitter that is not the transmitter with which said radar detector is co-located.

The radar detector may listen in a channel of a transmitter that is not the transmitter with which said radar detector is co-located and another radar detector may listen in a channel that is not used by any transmitters in a network.

The radar detector may listen in part of a band or sub-band of a transmitter which is not the transmitter with which said radar detector is co-located and another radar detector listens in another part of the band or sub-band occupied by a transmitter which is not the transmitter with which said radar detector is co-located.

The radar detector may listen on a channel that is not occupied by the transmitter for part of the time the radar detectors listens.

The radio transceiver may be configured to determine a bandwidth of a radar detected by the radar detector and vacate a bandwidth related to the bandwidth of the detected radar.

According to yet another aspect of the invention, a radio transceiver is disclosed that includes a receiver; a transmitter; and a radar detector co-located with the transmitter, wherein the radar detector first operates in a transmit channel of the transmitter and then operates in a transmit channel of another radio transceiver.

The radar detector may be configured to communicate results of a radar detection to a transmitter of another radio transceiver.

A second radar detector in another radio transceiver may listen for radar on a transmit channel of the transmitter.

The second radar detector may communicate results of a radar detection to control the transmitter.

The radar detector may communicate information to an aggregation point, said aggregation point using the information from the radar detector and the second radar detector to determine radar detection results.

A third radar detector co-located with another radio transceiver may listen for radar on the transmit channel of the transmitter.

The transmitter may receive results of radar detection status from the third radar detector.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

DETAILED DESCRIPTION

In a radio system that can have multiple radar detectors, such as a point-to-multipoint and other configurations in the array of backhaul networks, the radar detectors become a shared network resource. Embodiments of the invention make use of the shared resource by operating these detectors cooperatively, or in a coordinated manner, to perform the radar detection function efficiently and provide expanded capability such as channel look ahead, extended detection bandwidth, and more reliable detectability through location, angle, and antenna diversity.

Embodiments of the invention perform radar detection at the receiver side for the transmitter that occupies the channel at the same time the transmitter is sending. In some embodiments of the invention, the detector relays the results over a separate communications channel. This separate communications channel may be the part of an FDD link that operates in the other direction. The communication may also be indirect. For example, in some embodiments, communications may be attempted on a channel, and by virtue of not receiving a signal, it may be deduced that the channel is blocked due to radar detection. In another example, in some embodiments, a radar detector may transmit messages that a channel is clear on the channel, and, if radar is detected on the channel, the radar detector stops sending the messages from which it can be determined by transmitters that the channel is blocked due to radar detection.

Embodiments of the invention are also directed to operation of a radar detector in a full duplex system that transmits on the same channel at high duty factor so the detection is preferably performed remotely. This high-duty-factor system is able to determine the actual operating bandwidth required to be vacated in order to protect the detected radar.

Additionally, one or more radar detectors can be task-shared or time-shared so the detector or part of the detector can be reused while monitoring a high-duty-factor transmission system. An exemplary requirement for task sharing is to be able to use the same radar detector to perform monitoring of one channel while time-sharing the detector by performing an alternate channel CAC on another channel at a low duty factor. A background CAC may be performed for an alternate channel that can be used immediately in the event of a radar detection. This alternate channel detection is not disrupted by the adjacent or alternate channel operation of the occupied channel which may be operating at high duty factor.

Figure 1:
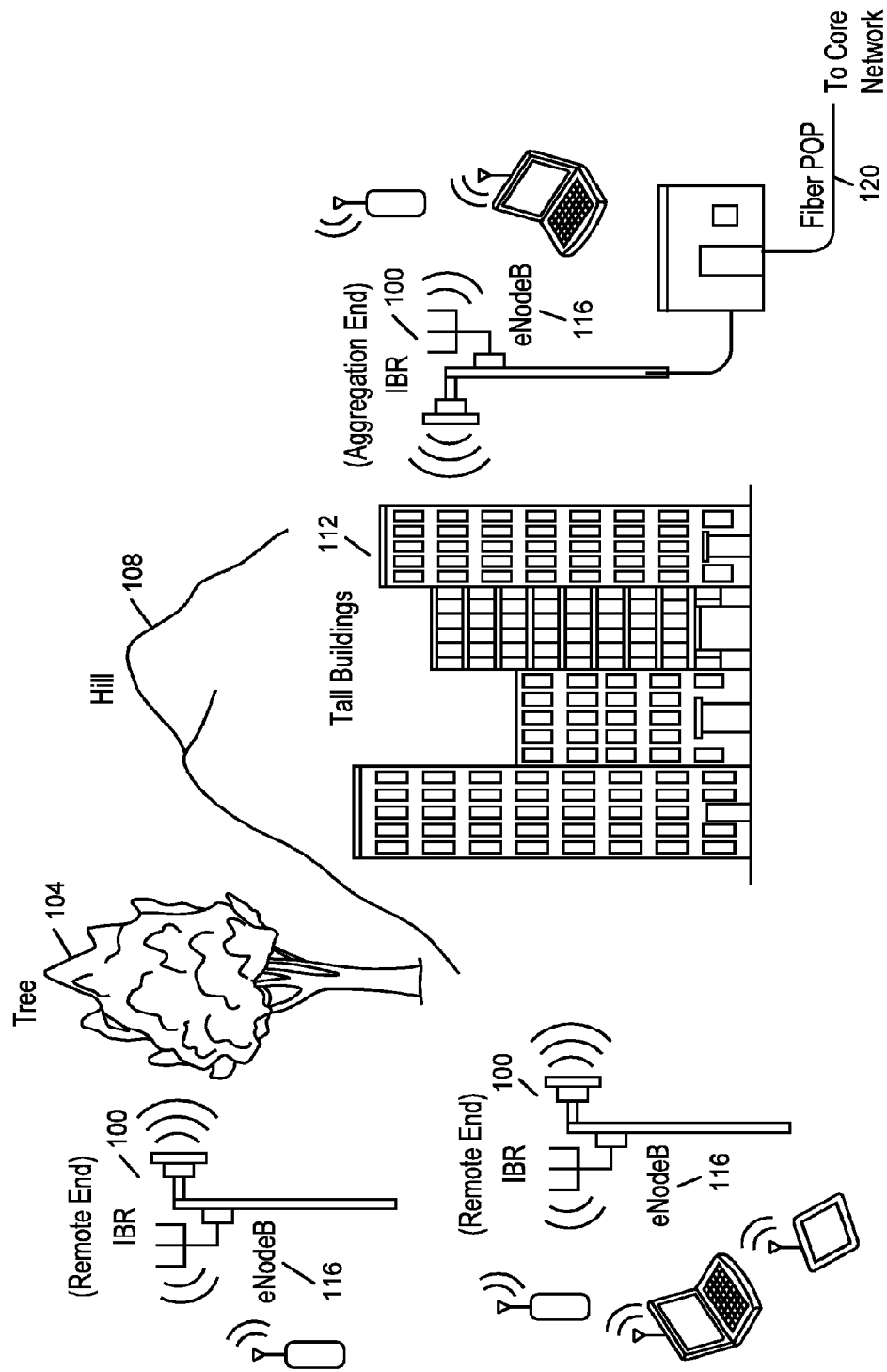
FIG. 1 is an illustration of intelligent radio transceivers (IBRs) deployed for cellular base station backhaul with obstructed LOS according to one embodiment of the invention.

FIG. 1 illustrates deployment of exemplary intelligent backhaul radio transceivers (IBRs) in accordance with an embodiment of the invention. As shown in FIG. 1, the IBRs 100 are deployable at street level with obstructions such as trees 104, hills 108, buildings 112, etc. between them. The IBRs 100 are also deployable in configurations that include point to multipoint (PMP), as shown in FIG. 1, as well as point to point (PTP). In other words, each IBR 100 may communicate with more than one other IBR 100.

For 3G and especially for 4th Generation (4G), cellular network infrastructure is more commonly deployed using "microcells" or "picocells." In this cellular network infrastructure, compact base stations (eNodeBs) 116 are situated outdoors at street level. When such eNodeBs 116 are unable to connect locally to optical fiber or a copper wireline of sufficient data bandwidth, then a wireless connection to a fiber "point of presence" (POP) requires obstructed LOS capabilities, as described herein.

For example, as shown in FIG. 1, the IBRs 100 include an Aggregation End IBR (AE-IBR) and Remote End IBRs (RE-IBRs). The eNodeB 116 of the AE-IBR is typically connected locally to the core network via a fiber POP 120. The RE-IBRs and their associated eNodeBs 116 are typically not connected to the core network via a wireline connection; instead, the RE-IBRs are wirelessly connected to the core network via the AE-IBR. As shown in FIG. 1, the wireless connection between the IBRs include obstructions (i.e., there may be an obstructed LOS connection between the RE-IBRs and the AE-IBR).

Figure 2:
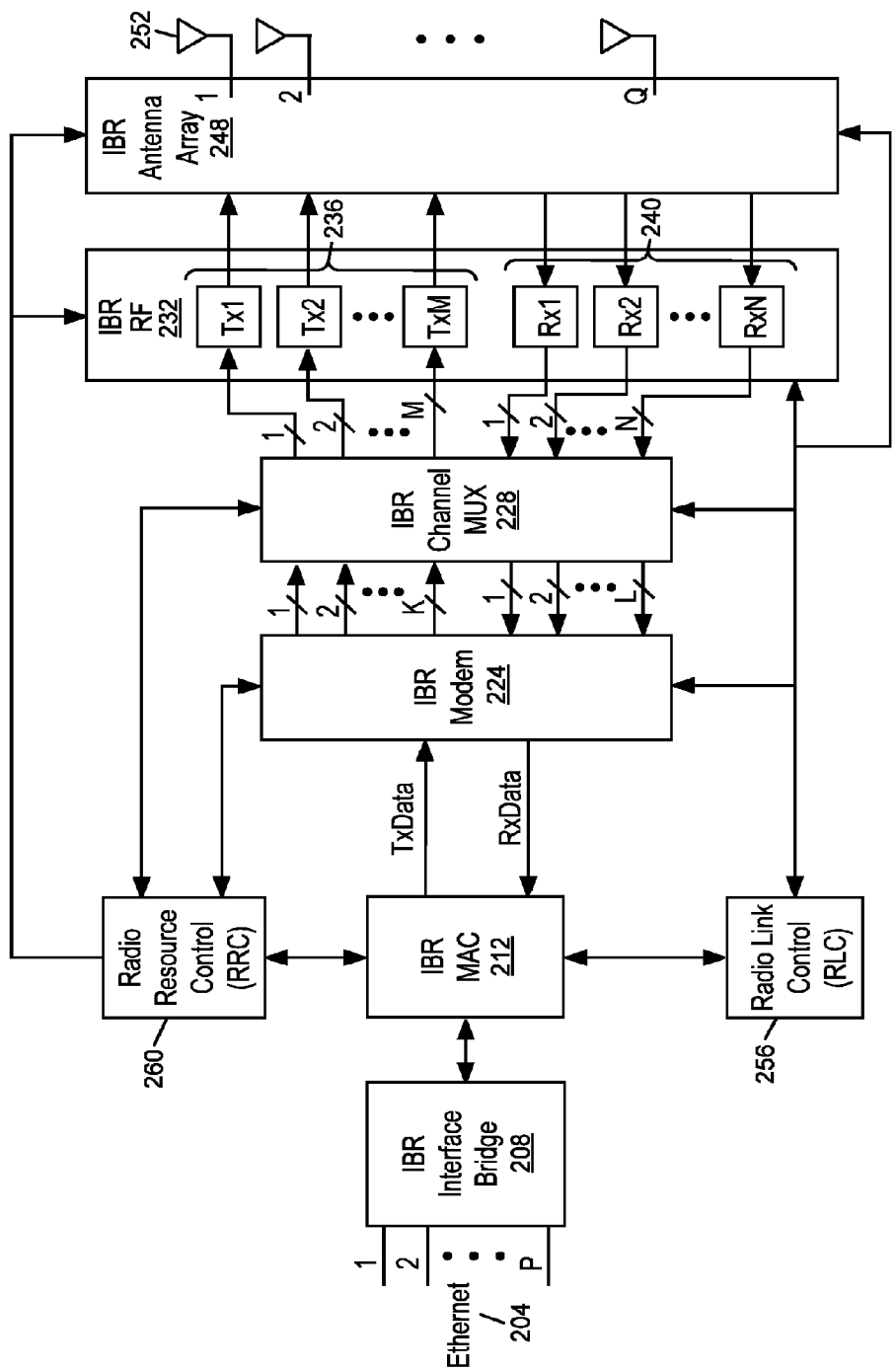
FIG. 2 is a block diagram of an IBR according to one embodiment of the invention.

FIG. 2 illustrates an exemplary embodiment of the IBR 100 shown in FIG. 1. In FIG. 2, the IBR 100 includes interfaces 104, interface bridge 108, MAC 112, modem 124, channel MUX 128, RF 132, which includes Tx1 . . . TxM 136 and Rx1 . . . RxN 140, antenna array 148 (includes multiple antennas 152), a Radio Link Controller (RLC) 156 and a Radio Resource Controller (RRC) 160. It will be appreciated that the components and elements of the IBRs may vary from that illustrated in FIG. 2. Additional details regarding the intelligent radio transceiver (IBR) are provided in commonly assigned U.S. patent application Ser. No. 13/645,472, U.S. Pat. No. 8,311,023 and U.S. Pat. No. 8,238,318, the disclosures of which are hereby incorporated herein by reference in their entirety.

The Intelligent Backhaul Radio transceiver (IBR) 100 is used in a point-to-point or point-to-multipoint connection that can be used for any radio interface that requires high throughput, including backhaul of cellular sites, connectivity among entities within an enterprise, Internet to enterprise, or Internet to customer premises equipment, campus networks, connectivity among stations in metropolitan area networks, and connection between Local Area Networks and Internet service.

Embodiments of the invention perform detection of radar signal sources that would be interfered by, or interfere with, the IBR. An exemplary embodiment of the required dynamic frequency selection (radar) requirement in regulatory environments, such as the U.S. and Europe that is used for detecting radars by the IBR equipment while operating radio links at a high duty factor, is used to describe embodiments of the invention.

There are significant advantages to effectively performing the radar detection for each transmitter at the receiver side for the array of wireless networked backhaul applications, such as the exemplary point-to-point and point-to-multipoint systems. In fact, for high duty factor FDD point-to-point systems, the radar detection results obtained when at least one radar detector is also co-located at the FDD receivers and when the radar detector has a less directional radar detection antenna than the transmit signal antenna are better for both operation of the radio link and for minimizing any potential interference with the radars due to the instant radio link than when the radar detection is performed only at the transmitter as known in other types of systems.

Because of the range difference, a radar positioned behind the receiver is closer to the detector than to the interfering radar transmitter. Because the radar detector antenna is omnidirectional or less directional than the radio link directional antennas, a radar located to the side of the pair or behind the transmitter is detected at the receiver before it is interfered with by the transmitter. The transmitter signal is reduced in level at the radar due to the directionality of the antenna, while the radar signal arrives full force at the radar detector.

Also, in an FDD radio using a radar detector co-located with the receiver, the detector can listen for the radar for 100% duty factor. This creates a peak-detection capability that insures the detector finds the largest radar signal of the time varying channel, overcoming the loss of multipath fading and a rotating radar detection antenna. For these reasons, embodiments of the invention are advantageous because the detectability of the radar is better both in the sense that actual radars are more reliably detected and in the sense that accidental false detections of non-existent radars are greatly reduced.

In an exemplary embodiment, the radio uses a separate radar detection circuit which is made from a commercial WiFi chip and which has its own antenna. The radar detection circuit inside the WiFi chip is used for the radar detection. It may or may not share a common RF signal path with the main operating antennas. There is a benefit in radar detectability if the radar detector antenna field is less directional than that of the actual signal antennas. In one extreme example, the radar detector antenna is omnidirectional or omnidirectional in azimuth, and the transmit signal antenna is a moderate or high gain antenna. The gain difference creates a bias for detection of radar signals versus interference from the transmit signal for radar angles that are behind or on the side of the radar mainlobe.

In an exemplary embodiment with a different band used for each transmit direction in a point-to-point or multi-point-to-point link, and which requires radar detection on each band or sub-band, the radar detection performs both initial CAC and in-service monitoring, but in different ways and at different times. Upon initial bootstrapping of the link, the CAC for each radio is performed at its local transmit frequency so the local transmitter can be informed of the result, since there is no link in the other direction yet. Then, after the radios establish a connection and are operating at high duty factor, the radar detector in each transceiver switches listening frequency and in-service monitoring is performed at the local receive frequency to listen for radars and so perform in-service monitoring for the transmitter sending from the other radio. More specifically, the in-service monitoring for the downlink transmitter happens at the downlink receiver in point-to-point or at the downlink receivers in multi-point-to-point, and the in-service monitoring for the uplink transmitter (or transmitters) happens at the uplink receiver. This is to satisfy the requirement for near 100% duty factor transmission while detecting at a level that is much lower than the transmit level. The results of the in-service monitoring are communicated along the opposite link direction to the transmit side which the monitoring was being performed for (i.e. the downlink communicates the uplink radar detection information and the uplink communicates the downlink radar detection information). If, for example, the uplink radar detector senses a radar signal, it notifies the uplink transmitter through the downlink radio set. In an exemplary embodiment, a controller, such as a radio resource controller, within the transceiver having the uplink transmitter can use this exemplary radar detection result along with other link quality inputs such as estimates of other uncoordinated interference levels observed over frequency, time, space or cancellation capability as described in U.S. Provisional Patent Application Ser. No. 61/910,194, the entirety of which is incorporated herein by reference, to optimally adjust parameters such as the uplink transmit channel center frequency, transmit channel bandwidth and/or transmit power.

The invention may be best understood in the context of a design example. It will be appreciated that other designs can be used, and the exemplary design example is not meant to be limiting in any way.

The exemplary radio link includes two full duplex transceivers, typically mounted on poles and separated by a large distance, such as five hundred meters. It will be appreciated that the distance may be less than or more than five hundred meters. One transmission direction operates in the upper part of the allocated RF band, called the upper band or sub-band, and other in the lower part of the allocated RF band, called the lower band or sub-band. The point-to-point or multi-point-to-point link in the example uses one radio designated as the downlink transmitter (using the lower part of the band) and the other as the uplink transmitter (using the upper part of the band). Each radio transceiver has a separate radar detection sensor co-located with it.

Even though the exemplary FDD operation divides this frequency band into a lower and upper band or sub-band, other implementations also can work, including, for example, overlapping bands or sub-bands, also known as Zero Division Duplexing (or ZDD) such as described in U.S. application Ser. No. 13/609,156 (now U.S. Pat. No. 8,422,540), the entirety of which is incorporated herein by reference. Within each band or sub-band the exemplary radios negotiate an operating frequency in each direction, one direction per band or sub-band. The exemplary radios use multiple transmit and receive antennas (MIMO) in each direction, and split the available transmit power among the transmit antennas or can operate with MISO, SISO, or SIMO operation. In such FDD or ZDD wireless communication systems, the transmitters in either of the uplink or downlink directions of point-to-point or multi-point-to-point systems transmit for some or all of each frame coincident in time meaning that both an uplink transmitter and a downlink transmitter are both transmitting at the same time possibly within different bands or sub-bands, possibly within the same band or sub-band or possibly even within the same channel. The remainder of this discussion will refer to these exemplary embodiment radios for purpose of explanation only, recognizing that there are many wireless communication system embodiments that can benefit from the invention.

The radio, based on an exemplary controller implemented with software and/or hardware, determines the operating frequency, within the constraints of satisfying any uniform channel usage requirement, performs medium access control using energy detection, and performs the Channel Availability Check (CAC). The CAC is a pre-scan of the channel to detect the presence of radars prior to allowing the equipment to transmit. The radio then monitors its channels using in-service monitoring.

In an exemplary embodiment, there is a brief period of time after the radar detector in the radio housing containing the downlink radio unit performs the CAC where it remains on the transmitter channel for in-service monitoring, while the transmitter channel operates at low duty factor to facilitate the detection synchronization and acquisition of the transmit signal by the other radio(s), and communicating to the other radio(s) what channel it would like to operate on. This is a bootstrap mode of operation. Once the communication link is established, the radar detector frequency channel is switched as described above so that it is listening on the receive channel to perform in-service monitoring for the transmitter in the other radio.

In a radar detection listening process, the radar detector attempts to receive signals transmitted from radars. In some embodiments, a radar detection message, control frame or status is transmitted by the radar detector if a signal received at the radar detector sufficiently matches one of a set of designated radar waveforms.

In some embodiments, the effective interference bandwidth of the radar receiver is determined. The effective interference bandwidth may be different than the occupied bandwidth of the radar transmit signal by some margin. In that case, only the effective interference bandwidth is vacated—instead of vacating a larger percentage of the overall frequency band for the required period of time (typically, 30 minutes). It will be appreciated that the period of time need not be limited to the minimum required by regulations. In some embodiments, the transceivers may remain off the channel for an extended period of time. The communication from the radar detector to the transmitter carries information related to the bandwidth that must be vacated.

In an exemplary embodiment, the effective interference bandwidth is determined by measuring the characteristics of the pulses that comprise the radar waveform to estimate what the radar receiver signal bandwidth is. A function is applied to the measured characteristics that adjusts for the ratio of radar receiver interference bandwidth at an anticipated excess interference power to radar receiver signal bandwidth required to process the radar pulse. The radar receiver interference bandwidth that is calculated is the bandwidth that needs to be vacated around the radar center frequency. In an exemplary embodiment, the function is a simple scaling by a constant. In some embodiments, the function depends on the type of radar signal that is detected and/or the excess power level of the detected radar signal over a minimum radar detection threshold. In an exemplary embodiment, the radar signal bandwidth is the inverse of the radar pulse period measured between the half-way points of the rising and falling edge. These are exemplary embodiments and other embodiments can use other methods for estimating the radar receiver bandwidth and applying various functions to the result are also anticipated.

In an exemplary embodiment, radar detection is performed on an alternate channel on a continued basis such that if a radar detection occurs on the operating channel, the alternate channel is available for more immediate occupancy because all or part of the CAC period is already accomplished. In another exemplary embodiment, after a sufficient CAC period has passed for the alternate channel to be useable, it is continually monitored for radars in order to keep the CAC information fresh. This alternate channel may be near the occupied channel and may encounter a similar, albeit reduced, level of interference from the transmitter. Therefore, in a high duty factor transmission radio link, the alternate channel monitoring can be done, at least for small channel separation, at a remote location so the transmission signal is attenuated. The communication between the alternate channel radar detection and the transmitter is kept fresh such that at least the regulatory impact for timeliness of the information is maintained. In an exemplary embodiment, a point-to-point radio link places both the in-channel radar detector and the alternate-channel radar detector in the receiver or remote detector that can communicate back to the transmitter. In another exemplary embodiment, a point-to-multipoint (or multi-point-to-point) radio link uses the radar detector in one receiver for in-channel detection and the radar detector in another receiver for alternate channel detection.

In an exemplary embodiment, one or more radar detectors that can operate while a high-duty-factor transmitter is transmitting perform time multiplexing between radar detection on the operating channel and radar detection on an alternate channel. In a further exemplary embodiment, the CAC operation is performed while listening for a partial duty factor for a total CAC time longer than the full duty factor CAC time, and at for least a period of time related to the partial duty factor fraction. In an exemplary embodiment, the length of the partial duty factor check time is at least the CAC time divided by the fractional duty factor. In an exemplary embodiment, a point-to-multipoint radio link uses the radar detector in one receiver for in-channel detection and the radar detector in another receiver for alternate channel detection and time-multiplexes one or both for additional alternate channel coverage to provide multiple alternate channel options.

Figure 3:
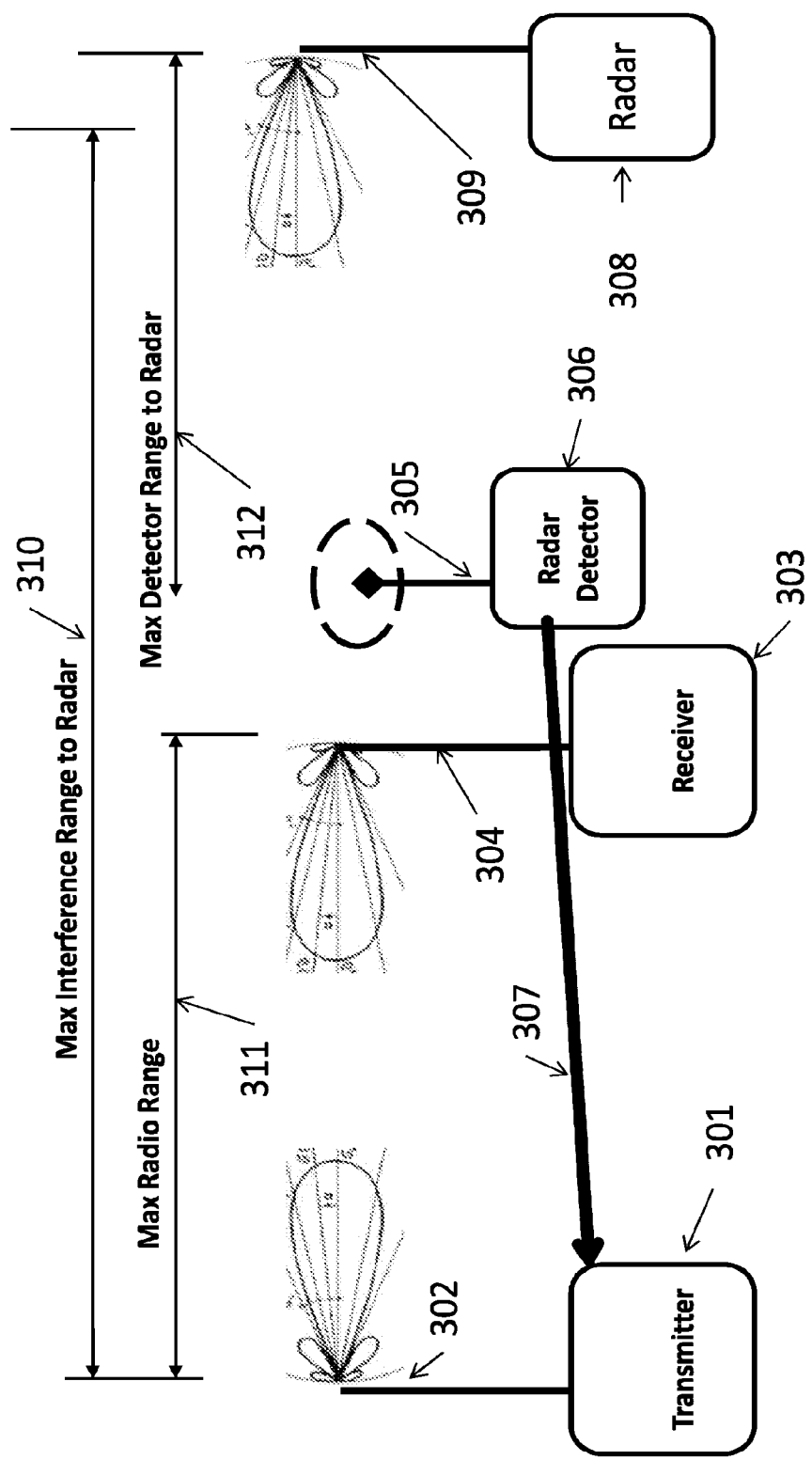
FIG. 3 is a schematic diagram showing radar detection according to one embodiment of the invention.

FIG. 3 shows a schematic representation of a one way radio link according to some embodiments of the invention. In FIG. 3, the radio link includes a transmitter 301 with a directional antenna 302, a receiver 303 with a directional antenna 304, and a radar detector 306 with an omnidirectional antenna 305. In one embodiment, one or both of the transmitter 301 and receiver 303 are within an IBR transceiver as shown in FIG. 2. A communication link 307 between the radar detector 306 and the transmitter 301 is used to communicate the results of any radar detection or non-detection from the radar detector 306 to the transmitter 301.

One problem with existing networks is that when the transmitter is transmitting, the high signal level swamps out the receive signals for typical receivers that are located in close proximity to the transmitter, thereby limiting the ability for a radar detector co-located with the transmitter to detect a radar signal. A co-located radar detector is one that is in close enough proximity to the transmitter that when antenna configurations are accounted for, the radar detector cannot detect a radar signal at the required level, as typically set by the appropriate regulatory authority, while the transmitter is transmitting. A radar detector is transmit-impaired if the signal from the transmitter prevents the radar detector from detecting radar signals at or above the regulatory limit while the impairing transmitter is emitting its transmit signal. A radar detector is not transmit-impaired if it can still detect radar signals at or above the regulatory limit while the transmitter is emitting its transmit signal. The transmitter may emit its transmit signal in the same channel as the radar detector to impair the radar detection, or the transmit signal may be emitted in a nearby channel, even if such nearby channel is in a different frequency band, and still impair the radar. The impairment can be prevented by separating the radar detector in distance from the transmitter, or by using a directional transmit antenna or directional radar-detector-receive antennas to reduce the impinging signal on the radar detector, or any other means to reduce the transmit signal level, including a cancellation circuit for cancelling the transmit signal at the input of or within the radar detector using, for example, techniques described in U.S. application Ser. No. 13/609,156 (now U.S. Pat. No. 8,422,540), the entirety of which is incorporated herein by reference.

In FIG. 3, a radar 308 with a directional antenna 309 is also shown. The radar 308 is shown relative to the range scales 310-312. The range scales include a maximum interference range to the radar 310, which is a range showing the maximum distance from the transmitter 301 to avoid interference with the radar 308. The range scales also include a Max Radio Range 311 which is the maximum distance from the transmitter 301 to the receiver 303. The range scales also include a Max Detector Range to Radar 312, which is the maximum distance that the detector 306 can detect radar. The radar detector 306 detects radar from the radar 308 in a range that is longer than the range at which the radio transmitter 301 interferes with the radar 308.

In operation, when the transmitter 301 operates at a high duty factor at the Max Radio Range 311, the radar detector 306 can detect the radar 308 at a range less than the Max Detector Range to the Radar 312. The Max Detector Range to the Radar 312 is the range at which the transmitter 301 would not interfere with the radar 308 receiver operation over the Max Interference Range to Radar 310.

Figure 4:
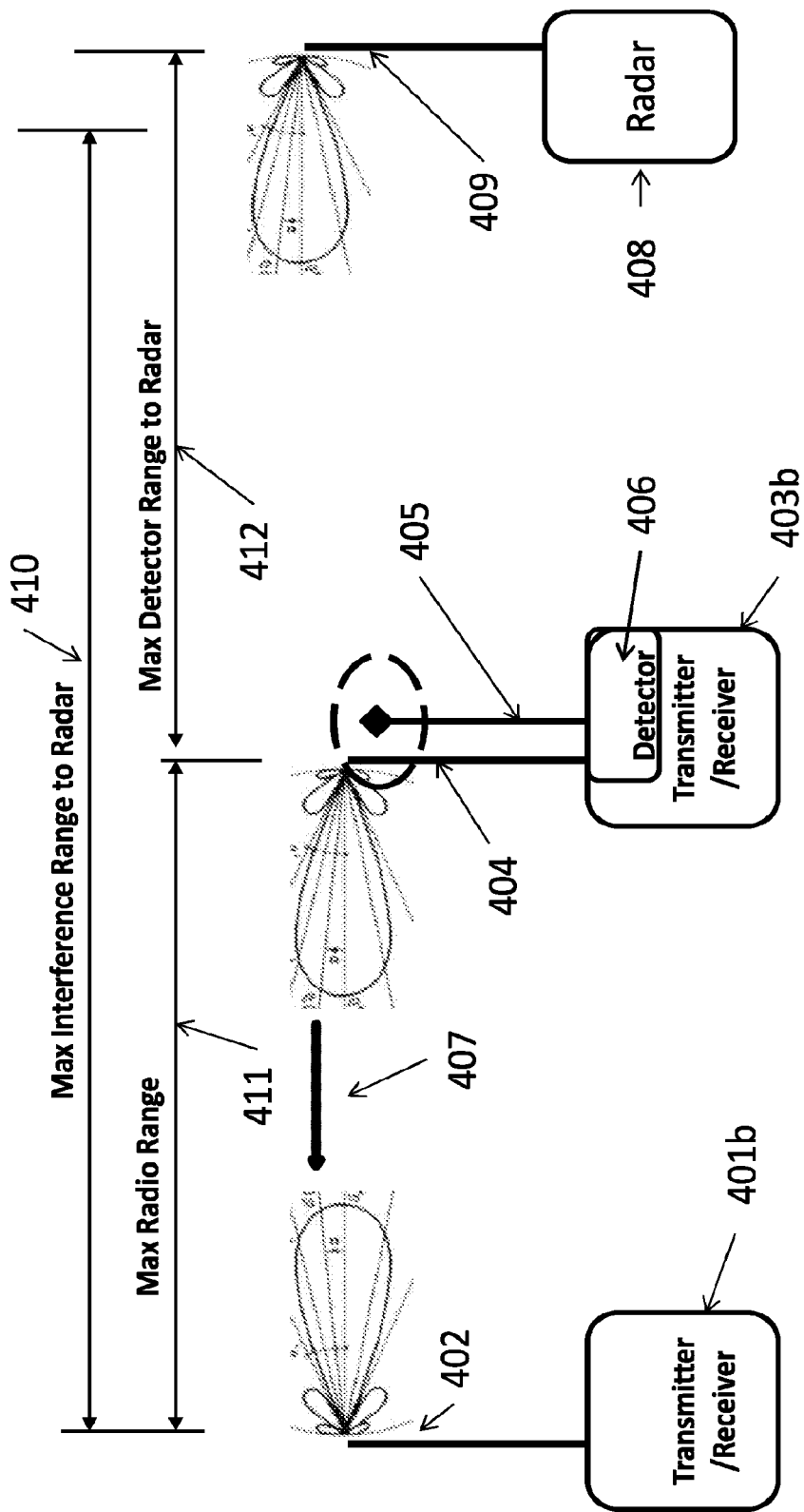
FIG. 4 is a schematic diagram showing radar detection according to another embodiment of the invention.

FIG. 4 shows a schematic representation of a radio link in accordance with some embodiments of the invention. In FIG. 4, the radio link includes a first transceiver 401 having an antenna 402 and a second transceiver 403 having an antenna 404. The second transceiver 403 includes a radar sensor/detector 406. The radar detector 406 is co-located with the transmitter of the second transceiver 403.

In the embodiment of FIG. 4, the radar detector 406 communicates back to the transmitter 401 using the radio transmission link between the first transceiver 401 and the second transceiver 403. In particular, in FIG. 4, the radar results are communicated over the operational channel in the transmitter in transceiver 403 to the receiver in transceiver 401. The radar detector 406 is shown as located in the same unit as transmitter/receiver 403 and controls the communication link 407.

It will be appreciated that a full duplex radio link with radar detection occurring on each side (the transmit side and the receive side), may be constructed from two or more links of this nature.

Figure 5:
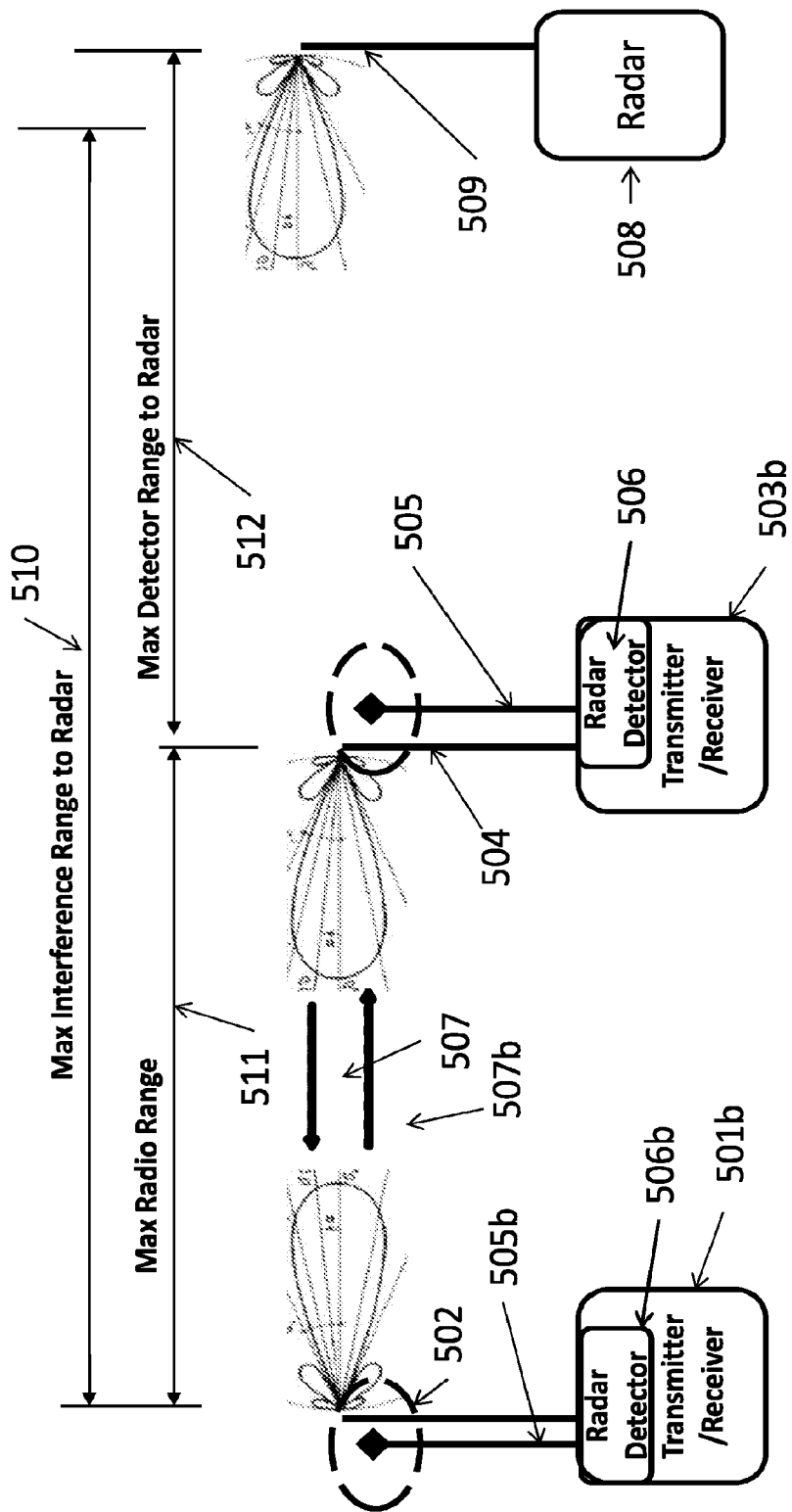
FIG. 5 is a schematic diagram showing radar detection according to a further embodiment of the invention.

FIG. 5 is a schematic representation of a radio link according to other embodiments of the invention. In FIG. 5, a radar detector 506a, 506b is provided in each transceiver 501, 503. The arrangement of FIG. 5 allows the use of the radar detectors 506 to operate as an in-service monitor on each link 507a, 507b and perform CAC and bootstrap in-service monitoring for its own link 507a, 507b.

In FIG. 5, first transceiver 501 includes a first radar detector 506a, and the second transceiver 503 includes a second radar detector 506b. A first communication link 507a is provided between the transmitter of the first transceiver 501 and the receiver of the second transceiver 503, and a second communication link 507b is provided between the transmitter of the second transceiver 503 and the receiver of the first transceiver 501. The communications links 507a and 507b are the transmission channels between the transceivers 501, 503.

In operation, the radar detector 506a communicates the results of its radar detection operations to the transceiver 503 using communications link 507a, and the radar detector 506b communicates the results of its radar detection to the transceiver 501 using the communications link 507b. The radar detection status results may be communicated on the transmission channel, for example, in the main data stream, the control block, or any method of signaling the information.

Figure 6:
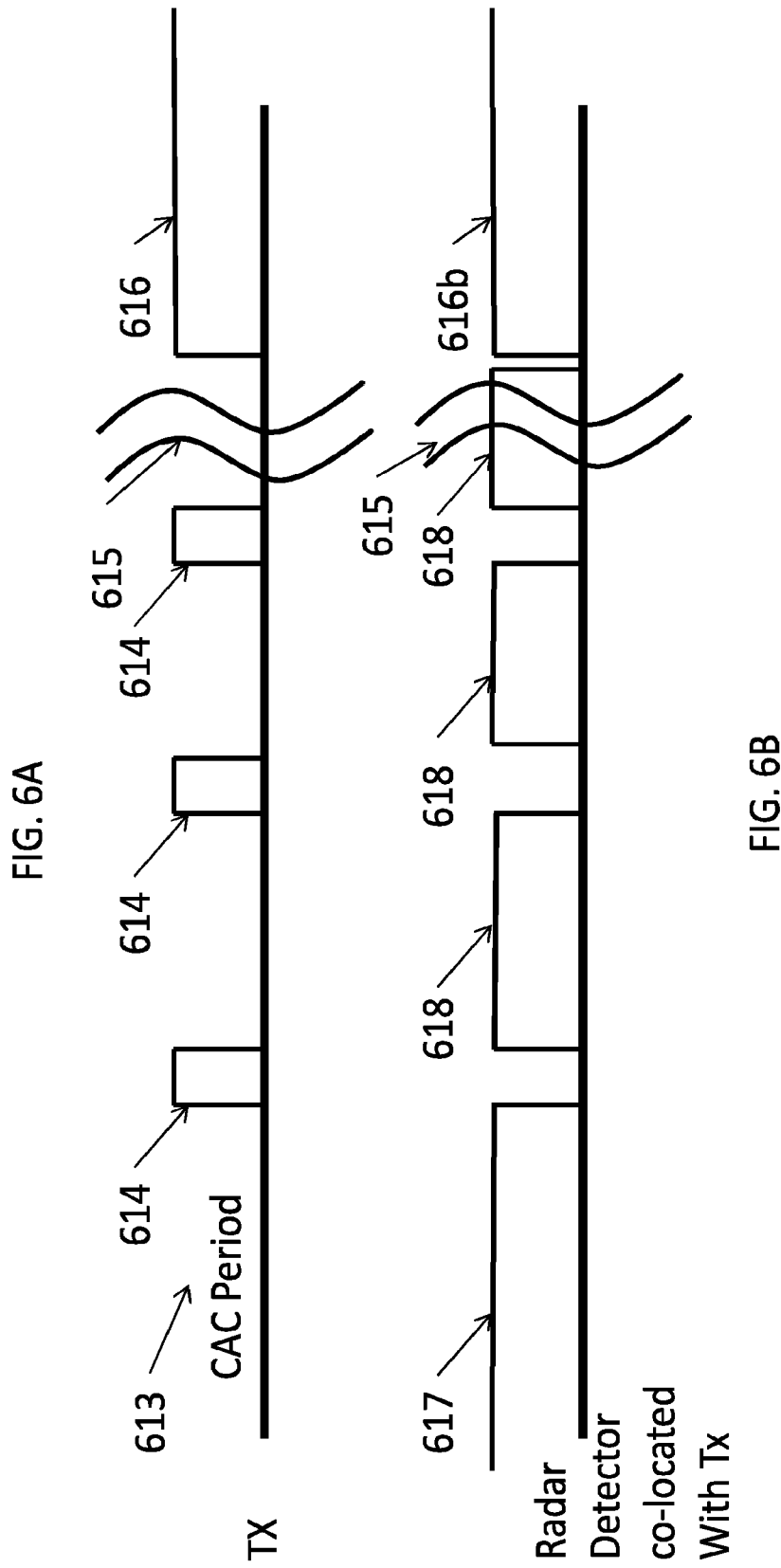
FIG. 6A is a timeline showing a radar detection process according to one embodiment of the invention.
FIG. 6B is a timeline showing a radar detection process according to another embodiment of the invention.

FIGS. 6A and 6B are time lines showing the radar detection operations for an exemplary link according to embodiments of the invention. In FIG. 6A, the timing operations of the transmitter are shown, and, in FIG. 6B, radar detection timing of a co-located radar detector is shown.

At a high-level, as shown in FIG. 6A, a CAC period 616 is followed by the low duty factor transmit periods for bootstrap, the low duty factor transmit periods for bootstrap 614 are followed by a time break 615, and the full duty factor transmission 616 follows the time break 615. The operations will now be described in further detail. As shown in FIG. 6A, the first event is the CAC period 613, which is performed by the radar detector on the radio's transmit channel. Once the CAC period 613 finishes, the links lock up. Until there is a reverse communication link, there is no information that can be communicated between them. So until that point in time, any CAC 613 or in-service monitoring 614 is performed locally because there would be no way to relay that information from the other side if it were performed remotely. To accomplish the local in-service monitoring the radar detector listens at the transmit frequency. Therefore, the transmitter cannot transmit all the time or the radar detection receiver is swamped. The transmitter is operated at a low duty factor during this bootstrap period to facilitate the radar detection during this period. Once the round trip connection is made, the radar detector is switched to the receive frequency and used as a remote radar detector for the opposite side. The reverse of this happens on the other side, so that radar detection is performed at the respective receivers of both devices. FIG. 6A shows the operation of the transmitter where the high level of the pulses 14 and 16 indicate the on-time of the transmission. The break in timing shown by the double lines 15 indicates there is no specific time duration of these steps because that depends on the implementation.

As shown in FIG. 6B, during the CAC period 613, the radar detector listens for radars. During the off cycles of the low duty factor transmission, the radar detector listens on the transmit channel for radars. When the transmitter operates at full duty factor, it is no longer listening on the same channel and switches to the receive channel for the transceiver it is co-located with. The high level of the pulses 617, 618 and 616b, indicate the active listening time of the radar detector that is co-located in the same radio as the transmitter shown in FIG. 6A. During the CAC period 613, the transmitter is off, and the radar detector is listening for radars 617 on the transmitter channel. After the CAC period 613 passes, the transmitter begins transmitting at a low duty factor 614 while the radar detector still listens on the transmitter frequency channel during the off period of the transmitter duty cycle 618. After there is a round trip connection, the transmitter operates at a high duty factor 616, which can be as high as 100%, and the radar detector operates at a high duty factor but at the channel of the receiver in the radio housing.

Figure 7:
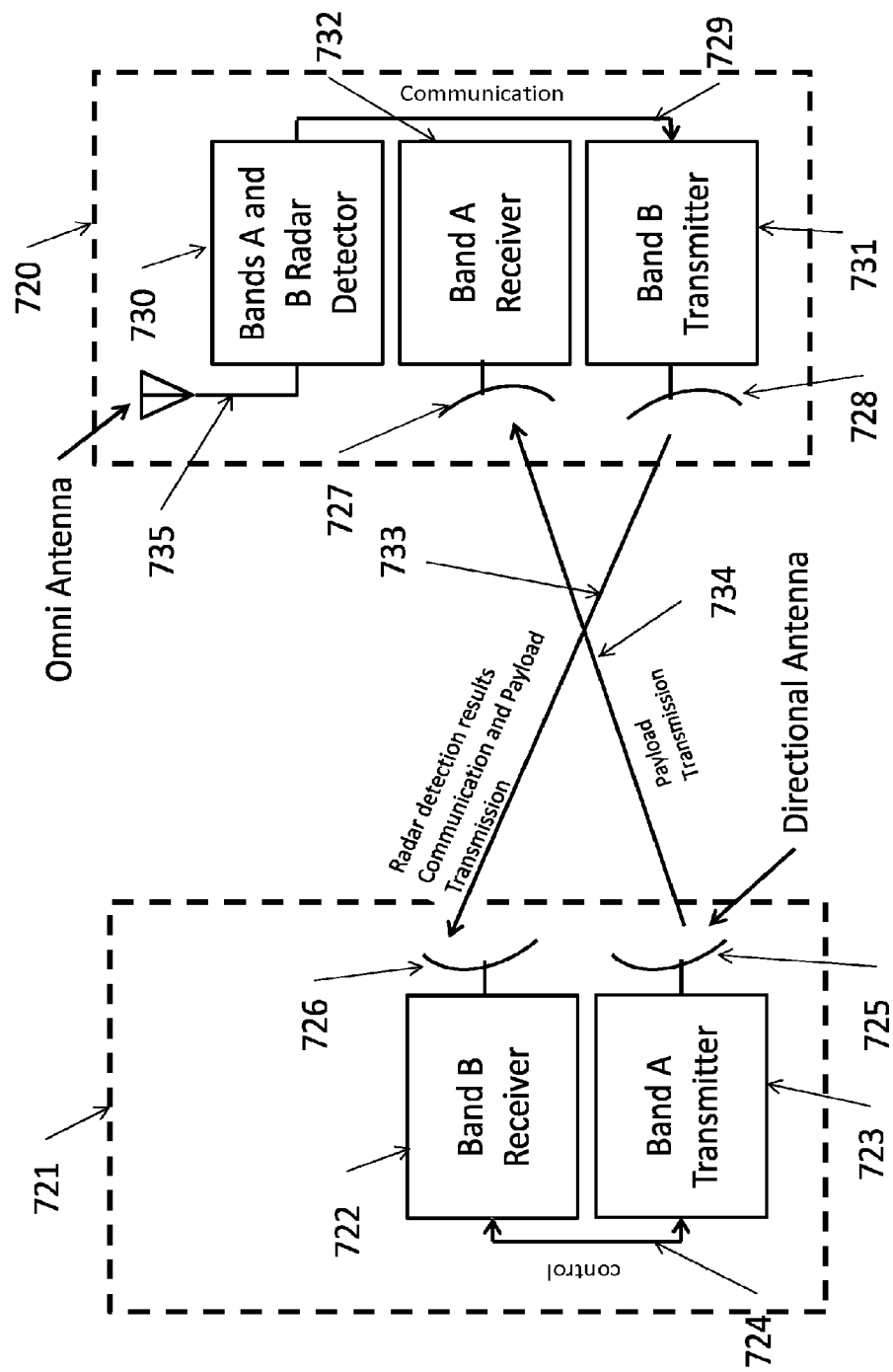
FIG. 7 is a block diagram showing radar detection according to one embodiment of the invention.

FIG. 7 shows a one-sided radar detection setup which has a transmitter and receiver on one side, and a transmitter, receiver and radar detector on the other side. The radar detector relays its results through the communication means through its local transmitter to the receiver on the other side, as a notification that the transmitter on the other side must stop transmitting. The exemplary block diagram in FIG. 7 indicates an exemplary implementation corresponding to the embodiment shown in FIG. 4.

FIG. 7 shows a radio link between a first transceiver 720 and a second transceiver 721. The second transceiver 721 includes a Band B receiver 722 and a Band A transmitter 723 in communication with one another over communications link 724. The Band A transmitter includes 723 includes a directional antenna 725, and the Band B receiver includes a directional antenna 726. The first transceiver 720 includes a Band A receiver 732 having a directional antenna 727 and a Band B transmitter 731 having a directional antenna 728. The first transceiver 720 further includes a Bands A and B Radar detector 730 having an omni-directional antenna 735. The Bands A and B Radar detector 730 is in communication with the Band B transmitter over link 729. The normal payload transmission traffic between transceivers 720 and 721 occurs over communications link 734 in the reverse direction on Band A and is transmitted by the Band A transmitter 723 and received by the Band A receiver 732.

In FIG. 7, the interaction between the Bands A and B radar detector 730 and the transmitter 723 is shown as a communication to the local transmitter 729 and the communication 733 through the local transmitter 729 to the remote receiver 726 is the combination of the radar information and the radio payload on transmission Band B. In this case, the Bands A and B radar detector 730 first listens through the omnidirectional antenna 735 on Band B for the CAC and low duty factor transmission from the Band B transmitter 731 through the directional antenna 728. The Bands A and B radar detector 730 signals through communication link 729 if the channel is clear or blocked. After bootstrap, the Bands A and B radar detector 730 switches its listening frequency to Band A and performs in-service monitoring for Band A transmitter 723. If the Bands A and B radar detector 730 detects a radar, it signals through communication link 729 to the Band B transmitter 731, and then over the air on radar detection results Communication and Payload Transmission 733 to radio 721. The radar detection results are received by the Band B receiver 722 through antenna 726. The Band B receiver 722 sends control information over link 724 to indicate to the Band A transmitter 723 that transmission needs to stop. The radio 721 then selects an alternate operating frequency if one is available.

Figure 8:
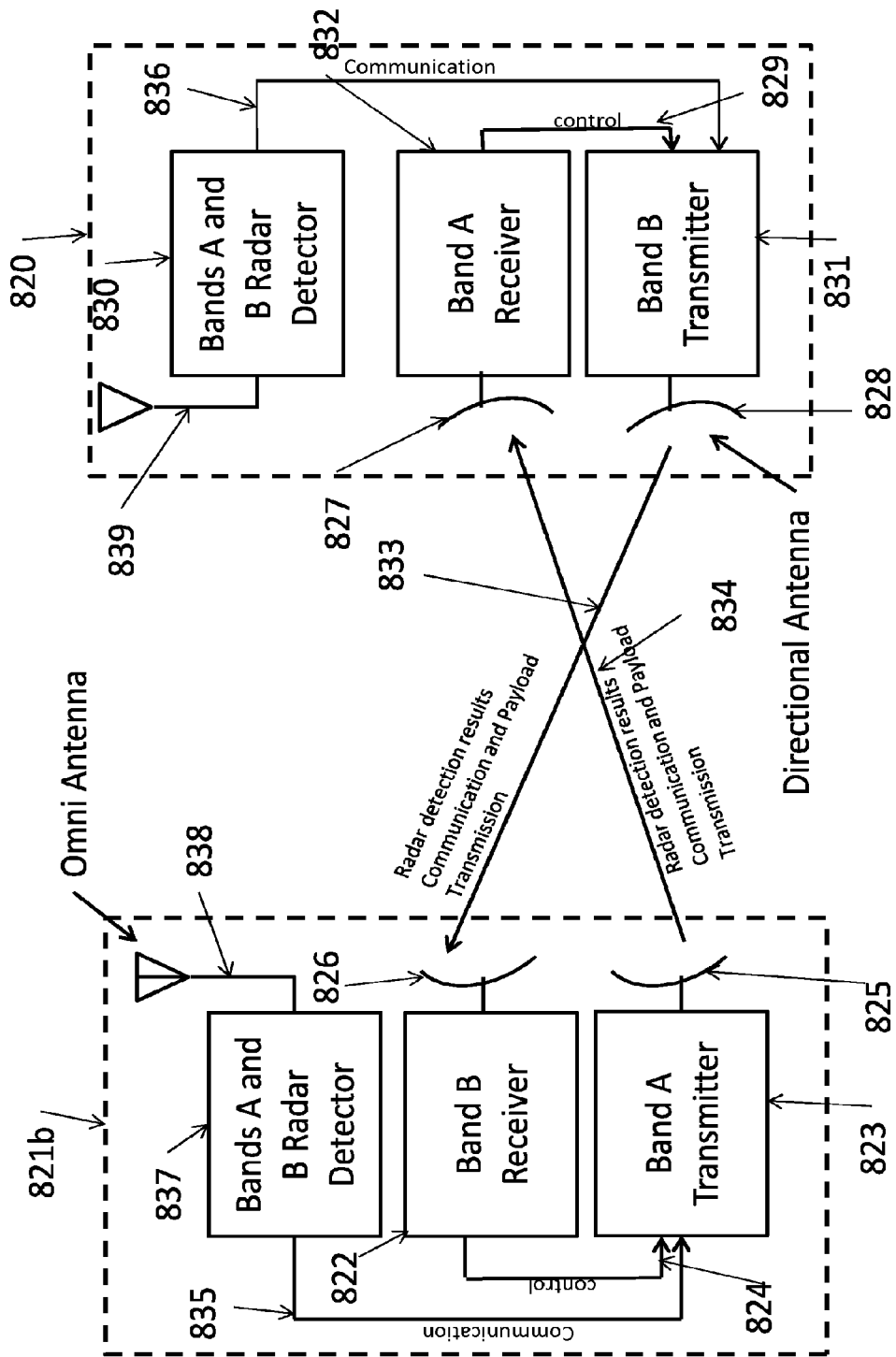
FIG. 8 is a block diagram showing radar detection according to another embodiment of the invention.

FIG. 8 shows a two-way link which has a transceiver and radar detector on both sides of the link. The radar detector on each side of the link uses its local communication links to either enable/disable its local transmitter after CAC and during bootstrap, or to communicate to the other side of the link to indicate to the other side that the transmitter has a clear channel or must stop transmitting due to a radar on its channel.

In particular, as shown in FIG. 8, the two-way link includes a first transceiver 820 and a second transceiver 821. The second transceiver 821 includes a Band B receiver 822 and a Band A transmitter 823 in communication with one another over communications link 824. The Band A transmitter includes 823 includes a directional antenna 825, and the Band B receiver includes a directional antenna 826. The second transceiver 821 further includes a Bands A and B Radar Detector 837 and an omni-directional antenna 838. A communications link 835 is provided between the Bands A and B Radar detector 837 and the Band A transmitter 823. The first transceiver 820 includes a Band A receiver 832 having a directional antenna 827 and a Band B transmitter 831 having a directional antenna 828. A communications link 829 is provided between the Band A receiver 832 and the Band B transmitter 831. The first transceiver 820 further includes a Bands A and B Radar detector 830 and an omni-directional antenna 839. The Bands A and B Radar detector 830 is in communication with the Band B transmitter over link 836. The normal payload transmission traffic between transceivers 820 and 821 occurs over link 834 in the reverse direction on Band A and is transmitted by the Band A transmitter 823 and received by the Band A receiver 832.

An exemplary sequence can be that each side listens in its respective transmit band, Band A for radio 821b and Band B for radio 820, during the respective CAC periods 17. After each radio passes CAC, the transmitter on one side, for example Band A transmitter 823, starts transmitting at low duty factor, and the Band A and B radar detector 837 performs in-service monitoring. After the Band A receiver 832 locks to the Band A transmitter 823, there is a reverse link transmission that locks the Band B transmitter 831 to the Band B receiver 822. Then, the Band A and B radar detectors 837 and 830 switch from their respective transmit bands to their respective receive bands, the Bands A and B Radar Detector 830 listens on Band A to monitor for radars in the channel of the Band A transmitter 823 and the Bands A and B Radar Detector 837 listens on Band B to monitor for radars in the channel of the Band B transmitter 831.

Figure 9:
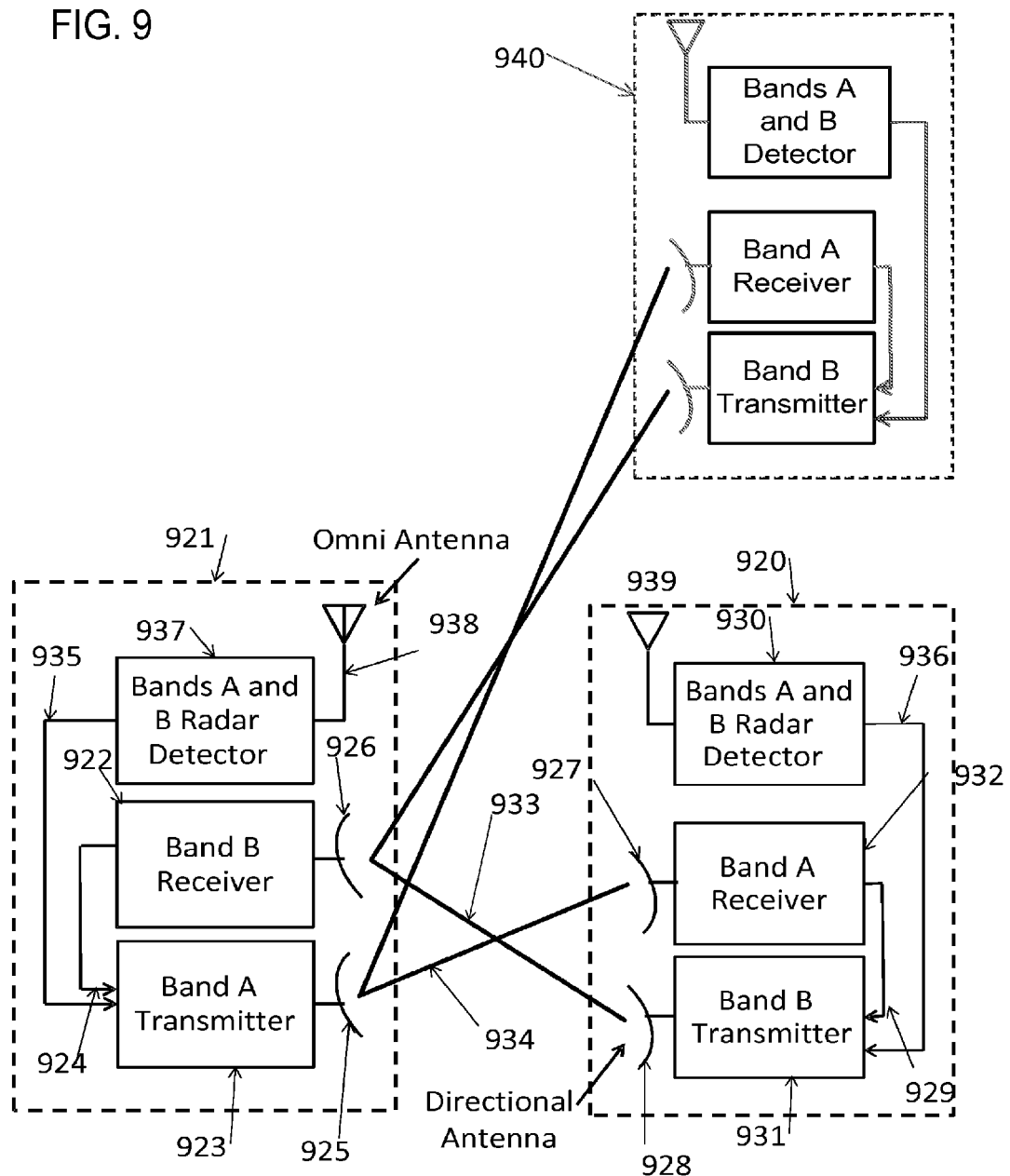
FIG. 9 is a block diagram showing radar detection according to a further embodiment of the invention.

FIG. 9 shows that the same approach is scalable to a point-to-multipoint network. It will be appreciated that the approach is also scalable to multiple point-to-point, ad hoc, ring, self-organizing, relay, mesh and other network architectures. It will be appreciated that the approach may be used with any connectivity architecture.

In FIG. 9, a third transceiver 939 is part of the network (or system). The third transceiver 939 is shown in FIG. 9 directly connected to transceiver 921. It will be appreciated that the third transceiver 939 could alternatively be directly connected to transceiver 920. In one exemplary embodiment, the transceiver 921 is a multipoint aggregator and transceivers 920 and 939 are multipoint remote units. In this case, each of the remote transceivers 920, 939 performs its own CAC on its respective transmit bands. After locking to the multipoint aggregator 921, the transceivers 920, 939 switch their Band A and B radar detectors to their receive bands to do in-service monitoring in the Band A Transmitter transmit band. If a radar is detected in one of the remote radios 920, 939, the aggregation radio 921 is informed through the communications link and it stops transmitting on that channel. A new channel is determined for both remote transceivers 920, 939. It will be appreciated that the results of individual radar detectors may be communicated to the other radios (not shown) in a sub-net or area wide network.

In the point-to-multipoint configuration of FIG. 9, the radar detection task is distributed among the remote transceivers 920, 939 such that they perform detection on different parts of the radar detection band or the useable bandwidth, each detecting on a portion of the bandwidth of interest, and including but not limited to one detecting on the operating channel while the other detects on an alternate channel that can be used as a hot spare to jump to in the event the operating channel must be vacated. The radar detectors in the radio system become a shared resource or network of radar detectors tied together through a communications systems, where the detectors are used cooperatively, or in a coordinated manor, to perform in-service monitoring, channel look ahead, extended detection bandwidth, and more reliable detectability through location, angle, and antenna diversity. In an exemplary embodiment, one remote radio detects on part of the channel bandwidth and the other remote radio detects on the remaining part. With more radar detectors, the load can be divided appropriately. In another exemplary embodiment, one remote radio performs radar detection on an assigned portion of the band or sub-band where the operating channel is, and at least one other radar detector in a different location performs radar detection in another portion of the band or sub-band, which is then available immediately if the operating channel has to be vacated. In one exemplary embodiment the distribution of detection bandwidth, operating bands, or sub-bands is determined early in the bootstrap period, and, in another exemplary embodiment, it is dynamically determined once the radio locks up and enters in-service monitoring. These radar detectors communicate their results back to the multipoint aggregator 921, or to each other in other configurations of the intercommunication. In a further exemplary embodiment, the aggregator 921 also has a radar detector co-located with the transmitter that can operate in the band or sub-band but sufficiently spaced from the operating channel that it is protected from the transmission and can perform radar detection on these well-separated channels to provide alternate channel availability for the transmitter.

One or more of the methodologies or functions described herein may be embodied in a computer-readable medium on which is stored one or more sets of instructions (e.g., software). The software may reside, completely or at least partially, within memory and/or within a processor during execution thereof. The software may further be transmitted or received over a network.

The term "computer-readable medium" should be taken to include a single medium or multiple media that store the one or more sets of instructions. The term "computer-readable medium" shall also be taken to include any medium that is capable of storing, encoding or carrying a set of instructions for execution by a machine and that cause a machine to perform any one or more of the methodologies of the present invention. The term "computer-readable medium" shall accordingly be taken to include, but not be limited to, solid-state memories, and optical and magnetic media.

Embodiments of the invention have been described through functional modules at times, which are defined by executable instructions recorded on computer readable media which cause a computer, microprocessors or chipsets to perform method steps when executed. The modules have been segregated by function for the sake of clarity. However, it should be understood that the modules need not correspond to discreet blocks of code and the described functions can be carried out by the execution of various code portions stored on various media and executed at various times.

It should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The invention has been described in relation to particular examples, which are intended in all respects to be illustrative rather than restrictive. Those skilled in the art will appreciate that many different combinations of hardware, software, and firmware will be suitable for practicing the present invention. Various aspects and/or components of the described embodiments may be used singly or in any combination. It is intended that the specification and examples be considered as exemplary only, with a true scope and spirit of the invention being indicated by the claims.

What is claimed is:

1. A wireless communications system comprising:
   a first transceiver, wherein the first transceiver comprises a first transmitter and a first receiver, and wherein the first transmitter transmits on a first transmit channel;
   a second transceiver, wherein the second transceiver comprises a second transmitter and a second receiver, and wherein the second transmitter transmits on a second transmit channel;
   wherein the first receiver receives from the second transmitter on the second transmit channel and the second receiver receives from the first transmitter on the first transmit channel;
   wherein the first transmit channel is within a first transmit frequency band and the second transmit channel is within a second transmit frequency band;
   a first radar detector, wherein the first radar detector is configured to detect radar signals within a first radar detection frequency range that includes at least part of the second transmit frequency band;
   wherein the first radar detector is configured to detect radar signals within at least a first time period, the first time period comprising at least a first period of time when the first transmitter and the second transmitter both transmit coincident in time;
   wherein the first radar detector communicates at least a first radar detection result to the second receiver;
   wherein the first radar detection result is an input to a first controller associated with the second transmitter; and
   wherein the first controller controls a transmission from the second transmitter based on the first radar detection result; and
   wherein the first radar detector is configured to be not transmit-impaired by the second transmitter when the second transmitter transmits, at least in part due to a physical separation of the first radar detector and the second transmitter.

2. The wireless communications system of claim 1 wherein the first radar detector is configured to be not transmit-impaired by the first transmitter when the first transmitter transmits, at least in part due to a physical separation of the first radar detector and the first transmitter.

3. The wireless communications system of claim 1 wherein the first radar detector is configured to be not transmit-impaired by the first transmitter when the first transmitter transmits, at least in part due to an antenna pattern of the first radar detector relative to the antenna pattern of the first transmitter.

4. The wireless communications system of claim 1 wherein the first controller associated with the second transmitter is capable of causing an adjustment of at least one adjustable parameter associated with the transmission of the second transmitter.

5. The wireless communications system of claim 4 wherein the at least one adjustable parameter associated with the transmission of the second transmitter is a transmit power.

6. The wireless communications system of claim 4 wherein the at least one adjustable parameter associated with the transmission of the second transmitter is a center frequency.

7. The wireless communications system of claim 5 wherein the transmit power of the second transmitter after the adjustment is at a level below that of a regulatory limit for transmit power within a channel for which a radar signal has been detected.

8. The wireless communications system of claim 1 wherein the first radar detection frequency range includes at least 80% of a bandwidth of the second transmit channel.

9. The wireless communications system of claim 8 wherein the first radar detection frequency range further includes at least 80% of a bandwidth of a first alternate channel that is different from the second transmit channel.

10. The wireless communications system of claim 1 wherein the first radar detection result is communicated within a radar detection message, control frame or status that at least indicates whether or not at least one radar signal has been detected within the first radar detection frequency range.

11. The wireless communications system of claim 1 wherein the first radar detection result is communicated within a radar detection message, control frame or status that at least indicates whether or not at least one radar signal has been detected within the second transmit channel.

12. The wireless communications system of claim 10 wherein the radar detection message, control frame or status indicates a bandwidth of the at least one detected radar signal within the first radar detection frequency range.

13. The wireless communications system of claim 1 wherein the part of the first time period when at least the first transmitter and the second transmitter both transmit coincident in time is 100% of the first time period for which the first radar detector is configured to at least detect radars.

14. The wireless communications system of claim 4 wherein the first controller associated with the second transmitter is capable of causing the adjustment based at least upon the first radar detection result.

15. The wireless communications system of claim 1 wherein the first transmit frequency band overlaps in frequency with the second transmit frequency band.

16. The wireless communications system of claim 1 wherein the first radar detection frequency range does not overlap in frequency with the first transmit frequency band.

17. The wireless communications system of claim 1 wherein the first radar detection frequency range is identical to or a subset of the second transmit frequency band.

18. The wireless communications system of claim 1 further comprising: a second radar detector;
wherein the second radar detector is configured to detect radar signals within at least a second time period, the second time period comprising at least a period of time when the first transmitter and the second transmitter both transmit coincident in time; and
wherein the second radar detector is configured to detect radar signals within a second radar detection frequency range.

19. The wireless communications system of claim 18 wherein the first time period overlaps in time with the second time period.

20. The wireless communications system of claim 18 wherein the second radar detection frequency range excludes the second transmit channel.

21. The wireless communications system of claim 18 wherein the second radar detection frequency range includes at least a second alternate channel that is different from the second transmit channel.

22. The wireless communications system of claim 18:
wherein the second radar detector communicates at least a second radar detection result to the second receiver;
and wherein the second radar detection result is an input to the first controller associated with the second transmitter.

23. The wireless communications system of claim 22 wherein the second radar detection result is communicated within a radar detection message, control frame or status that at least indicates whether or not at least one radar has been detected within the second alternate channel.

24. The wireless communications system of claim 18:
wherein the second radar detector communicates at least a second radar detection result to the first receiver;
wherein the second radar detection result is an input to a second controller associated with the first transmitter;
and wherein the second controller controls a transmission from the first transmitter based on the second radar detection result.

25. The wireless communications system of claim 18 wherein the second radar detection frequency range is identical to or a subset of the first transmit frequency band.

26. The wireless communications system of claim 23 further comprising:
a third radar detector;
wherein the third radar detector is configured to detect radar signals within at least a third time period, the third time period comprising at least a period of time when the first transmitter and the second transmitter both transmit coincident in time;
wherein the third radar detector is configured to detect radar signals within a third radar detection frequency range;
wherein the third radar detector communicates at least a third radar detection result to the first receiver;
and wherein the third radar detection result is an input to a third controller associated with the first transmitter.

27. The wireless communications system of claim 1 further comprising:
a first cancellation circuit, wherein the first cancellation circuit is coupled to at least the first radar detector;
and wherein the first cancellation circuit generates a first cancellation signal representative of an output of the first transmitter such that the first cancellation signal in combination with a received signal for the first radar detector together result in a reduced level of first transmitter signal impairment within the first radar detector.

28. The wireless communications system of claim 1 further comprising:
a second radio resource controller, wherein the second radio resource controller comprises the first controller associated with the second transmitter;
and wherein the second radio resource controller is capable of causing an adjustment of at least one adjustable parameter associated with the transmission of the second transmitter based upon at least one additional link quality input and the first radar detection result.

29. The wireless communications system of claim 24 further comprising:
a first radio resource controller, wherein the first radio resource controller comprises the second controller associated with the first transmitter;
and wherein the first radio resource controller is capable of causing an adjustment of at least one adjustable parameter associated with the transmission of the first transmitter based upon at least one additional link quality input and the second radar detection result.

30. The wireless communications system of claim 1 wherein the first radar detector is configured to be not transmit-impaired by the second transmitter when the second transmitter transmits, at least in part due to an antenna pattern of the first radar detector relative to the antenna pattern of the second transmitter.

31. The wireless communications system of claim 4 wherein the at least one adjustable parameter associated with the transmission of the second transmitter is a channel bandwidth.

32. The wireless communications system of claim 10 wherein the radar detection message, control frame or status indicates a transmission frequency of the at least one detected radar signal within the first radar detection frequency range.

33. The wireless communications system of claim 1 wherein the first transceiver further comprises the first radar detector.

34. The wireless communications system of claim 22 wherein the first transceiver further comprises the second radar detector.

35. The wireless communications system of claim 26 wherein the second transceiver further comprises the third radar detector.

36. The wireless communications system of claim 26 wherein the third controller is comprised within the second controller.

37. The wireless communications system of claim 27 wherein the first transceiver further comprises the first cancellation circuit.

38. The wireless communications system of claim 1 further comprising:
a second cancellation circuit, wherein the second cancellation circuit is coupled to at least the first radar detector;
and wherein the second cancellation circuit generates a second cancellation signal representative of an output of the second transmitter such that the second cancellation signal in combination with a received signal for the first radar detector together result in a reduced level of second transmitter signal impairment within the first radar detector.

39. The wireless communications system of claim 29 wherein the first transceiver further comprises the first radio resource controller.

40. The wireless communications system of claim 28 wherein the second transceiver further comprises the second radio resource controller.

41. The wireless communications system of claim 1 wherein the first transmit frequency band is coincident with the second transmit frequency band.

42. The wireless communications system of claim 1 wherein the first radar detection frequency range is coincident with the second transmit channel.

43. The wireless communications system of claim 4 wherein the at least one adjustable parameter associated with the transmission of the second transmitter is a time of transmission.

44. The wireless communications system of claim 20 wherein the second transceiver further comprises the second radar detector.

45. The wireless communications system of claim 1 wherein the first radar detector communicates at least the first radar detection result to the second receiver via the first transmitter.

46. The wireless communications system of claim 22 wherein the second radar detector communicates at least the second radar detection result to the second receiver via the first transmitter.

47. The wireless communications system of claim 26 wherein the third radar detector communicates at least the third radar detection result to the first receiver via the second transmitter.

48. The wireless communications system of claim 27 further comprising:
a second cancellation circuit, wherein the second cancellation circuit is coupled to at least the first radar detector;
and wherein the second cancellation circuit generates a second cancellation signal representative of an output of the second transmitter such that the second cancellation signal in combination with a received signal for the first radar detector together result in a reduced level of second transmitter signal impairment within the first radar detector.

49. The wireless communication system of claim 48 where the second cancellation circuit is comprised within the first cancellation circuit.

50. A wireless communications system comprising:
a first transceiver, wherein the first transceiver comprises a first transmitter and a first receiver, and wherein the first transmitter transmits on a first transmit channel;
a second transceiver, wherein the second transceiver comprises a second transmitter and a second receiver, and wherein the second transmitter transmits on a second transmit channel;
wherein the first receiver receives from the second transmitter on the second transmit channel and the second receiver receives from the first transmitter on the first transmit channel;
wherein the first transmit channel is within a first transmit frequency band and the second transmit channel is within a second transmit frequency band;
a first radar detector, wherein the first radar detector is configured to detect radar signals within a first radar detection frequency range that includes at least part of the second transmit frequency band;
wherein the first radar detector is configured to detect radar signals within at least a first time period, the first time period comprising at least a first period of time when the first transmitter and the second transmitter both transmit coincident in time;
wherein the first radar detector communicates at least a first radar detection result to the second receiver;
wherein the first radar detection result is an input to a first controller associated with the second transmitter; and
wherein the first controller controls a transmission from the second transmitter based on the first radar detection result; and
wherein the first radar detector is configured to be not transmit-impaired by the second transmitter when the second transmitter transmits, at least in part due to a physical separation of the first radar detector and the second transmitter; and wherein the first radar detector is configured to be not transmit-impaired by the first transmitter when the first transmitter transmits, at least in part due to a physical separation of the first radar detector and the first transmitter.

51. A wireless communications system comprising:

a first transceiver, wherein the first transceiver comprises a first transmitter and a first receiver, and wherein the first transmitter transmits on a first transmit channel;

a second transceiver, wherein the second transceiver comprises a second transmitter and a second receiver, and wherein the second transmitter transmits on a second transmit channel;

wherein the first receiver receives from the second transmitter on the second transmit channel and the second receiver receives from the first transmitter on the first transmit channel;

wherein the first transmit channel is within a first transmit frequency band and the second transmit channel is within a second transmit frequency band;

a first radar detector, wherein the first radar detector is configured to detect radar signals within a first radar detection frequency range that includes at least part of the second transmit frequency band;

wherein the first radar detector is configured to detect radar signals within at least a first time period, the first time period comprising at least a first period of time when the first transmitter and the second transmitter both transmit coincident in time;

wherein the first radar detector communicates at least a first radar detection result to the second receiver;

wherein the first radar detection result is an input to a first controller associated with the second transmitter; and wherein the first controller controls a transmission from the second transmitter based on the first radar detection result; and wherein the first radar detector is configured to be not transmit-impaired by the second transmitter when the second transmitter transmits, at least in part due to a physical separation of the first radar detector and the second transmitter; and wherein the first radar detector is configured to be not transmit-impaired by the first transmitter when the first transmitter transmits, at least in part due to an antenna pattern of the first radar detector relative to the antenna pattern of the first transmitter.

* * * * *